(12) United States Patent
Leonardos

(10) Patent No.: US 7,814,134 B2
(45) Date of Patent: Oct. 12, 2010

(54) SYSTEM AND METHOD FOR PROVIDING INTEGRATED MANAGEMENT OF ELECTRONIC INFORMATION

(76) Inventor: Gustavos Leonardos, Pintor Oswaldo Teixeira 380, Barra da Tijuca, Rio de Janeiro, R. J. 22631-420 (BR)

( * ) Notice: Subject to any disclaimer, the term of this patent is extended or adjusted under 35 U.S.C. 154(b) by 563 days.

(21) Appl. No.: 10/873,775

(22) Filed: Jun. 22, 2004

(65) Prior Publication Data

US 2004/0236775 A1 Nov. 25, 2004

Related U.S. Application Data

(63) Continuation of application No. 09/729,654, filed on Dec. 4, 2000, now Pat. No. 6,778,972.

(51) Int. Cl.
*G06F 12/00* (2006.01)
*G06F 17/30* (2006.01)

(52) U.S. Cl. ................... 707/830; 726/28; 715/205
(58) Field of Classification Search ............. 707/1–3, 707/100–102
See application file for complete search history.

(56) References Cited

U.S. PATENT DOCUMENTS

| | | | |
|---|---|---|---|
| 5,526,520 A | 6/1996 | Krause | 707/104.1 |
| 5,544,360 A | 8/1996 | Lewak et al. | 707/1 |
| 5,600,844 A * | 2/1997 | Shaw et al. | 715/500 |
| 5,684,984 A | 11/1997 | Jones et al. | |
| 5,771,379 A | 6/1998 | Gore, Jr. | |
| 5,813,009 A | 9/1998 | Johnson et al. | |
| 5,832,470 A | 11/1998 | Morita et al. | 707/1 |
| 5,860,066 A | 1/1999 | Rouse | 705/1 |
| 5,950,206 A | 9/1999 | Krause | 707/104.1 |
| 5,991,776 A | 11/1999 | Bennett et al. | |
| 6,055,530 A | 4/2000 | Sato | 707/3 |
| 6,073,148 A * | 6/2000 | Rowe et al. | 715/205 |
| 6,098,066 A | 8/2000 | Snow et al. | |
| 6,219,668 B1 * | 4/2001 | Arnaud et al. | 707/10 |
| 6,240,429 B1 * | 5/2001 | Thornton et al. | 715/500 |
| 6,243,713 B1 | 6/2001 | Nelson et al. | 707/104.1 |
| 6,260,049 B1 | 7/2001 | Fitzgerald et al. | |

(Continued)

FOREIGN PATENT DOCUMENTS

WO WO97/07468 2/1997

(Continued)

OTHER PUBLICATIONS

Geodesia-Collaboration, available at www.geodesia.com/collab.html, downloaded on Feb. 9, 2001.

(Continued)

*Primary Examiner*—Sathyanarayan Pannala
(74) *Attorney, Agent, or Firm*—Chadbourne & Parke LLP; Walter G. Hanchuk

(57) ABSTRACT

A system and method for managing electronic information using a computer system for one or more users, comprising creating an electronic folder and storing the folder in an electronic folder management system, creating files for the electronic folder, maintaining a collection of electronic folders and the files stored therein, and associating the electronic folders with one or more files such that each of the files may be accessed by identifying the related electronic folder.

77 Claims, 32 Drawing Sheets

U.S. PATENT DOCUMENTS

| | | | |
|---|---|---|---|
| 6,289,460 B1 * | 9/2001 | Hajmiragha | 726/28 |
| 6,308,173 B1 | 10/2001 | Glasser et al. | |
| 6,360,215 B1 | 3/2002 | Judd et al. | 707/3 |
| 6,401,097 B1 | 6/2002 | McCotter et al. | 707/102 |
| 6,427,175 B1 | 7/2002 | Khan et al. | |
| 6,446,061 B1 | 9/2002 | Doerre et al. | 707/3 |
| 6,457,017 B2 | 9/2002 | Watkins et al. | 707/103 R |
| 6,480,839 B1 | 11/2002 | Whittington et al. | 707/3 |
| 6,584,466 B1 * | 6/2003 | Serbinis et al. | 707/10 |
| 6,615,248 B1 | 9/2003 | Smith | |
| 6,704,118 B1 | 3/2004 | Hull et al. | 358/1.15 |
| 6,810,404 B1 | 10/2004 | Ferguson et al. | 707/200 |
| 6,820,094 B1 | 11/2004 | Ferguson et al. | 707/200 |
| 6,834,276 B1 | 12/2004 | Jensen et al. | 707/2 |
| 6,886,047 B2 * | 4/2005 | Leong et al. | 709/246 |
| 6,910,021 B2 * | 6/2005 | Brown et al. | 705/40 |
| 6,947,959 B1 | 9/2005 | Gill | 707/501 |
| 2001/0037379 A1 | 11/2001 | Livnat | |

FOREIGN PATENT DOCUMENTS

| | | |
|---|---|---|
| WO | WO98/03928 | 1/1998 |

OTHER PUBLICATIONS

Geodesia-Workrooms, available at www.geodesia.com/workroom.html, downloaded on Jun. 14, 2001.

Intranets.com-Get everyone on the same page, available at www.intranets.com, downloaded on Mar. 2, 2001.

Get everyone on the same page, available at http://www.intranets.com/ProductInfo/Features/Descriptions.asp?ed=se&app=Document%20Management, downloaded on Apr. 17, 2001.

Welcome to Microsoft's homepaqe, available at www.microsoft.net/ms.htm, downloaded on Aug. 31, 2000.

Paperless Office Document Management Workflow Management Software Filing System , available at www.epaperlessoffice.com, downloaded Feb. 15, 2001.

Paperless Office Workflow Management Document Management Software Filing System , available at www.cabinet.com/main.html, downloaded on Feb. 2, 2001.

Paperless Office Document Management Overview of Cabinet NG, available at www.cabinetng.com/paperlessofficereview.html, downloaded on Feb. 16, 2001.

www.schedule.net: The World's FREE Web-Based Shift Scheduling Network, available at www.schedule.net, downloaded on Feb. 10, 2001.

International Search Report, mailed Oct. 4, 2001, pp. 1-4.

* cited by examiner

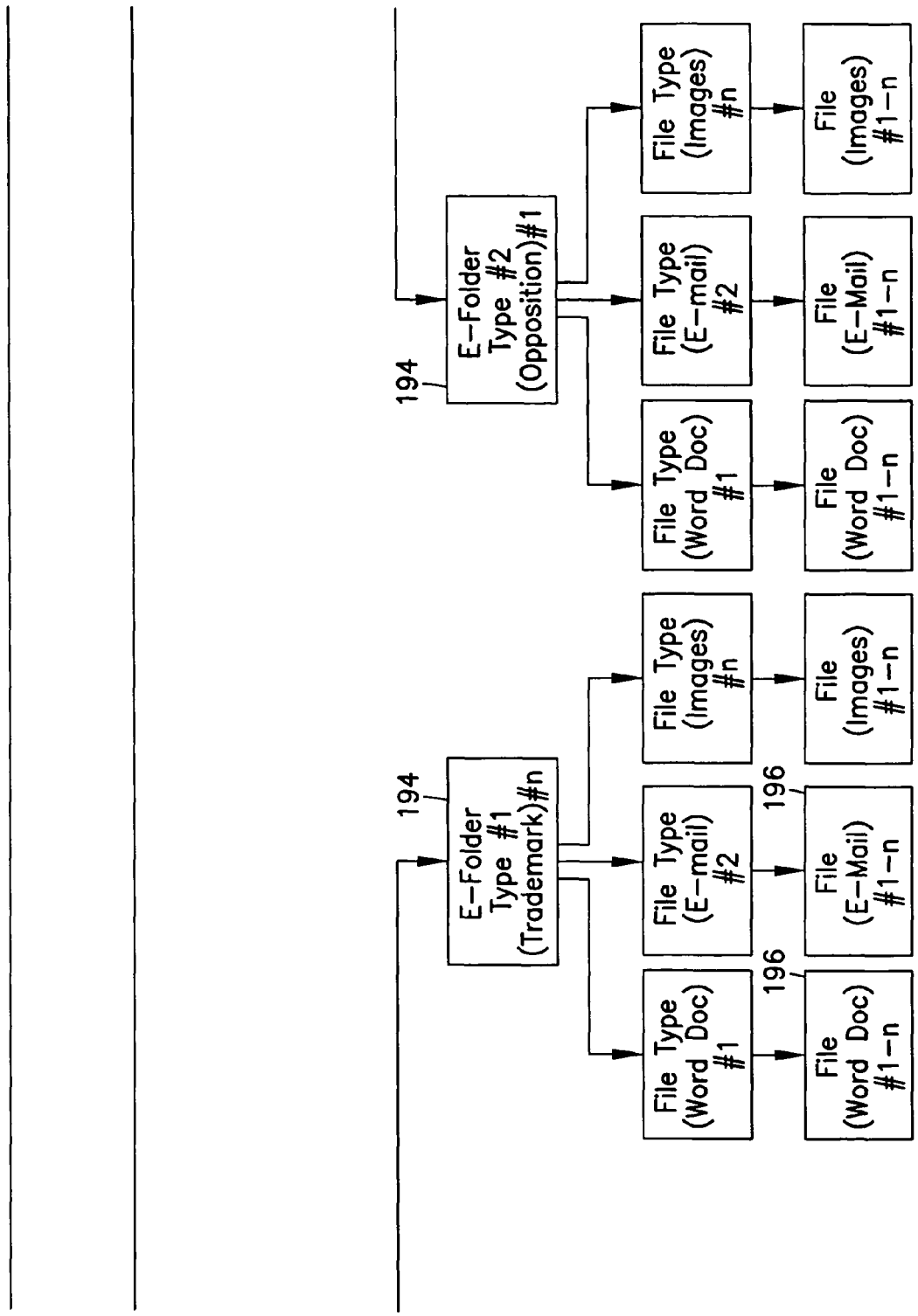

FIG. 12A

Intranet–Momsen, Leonardos & Cia
Diversos Institucionais Consultas Cadastramento Rotinas Email Navegação Sair

MOMSEN, LEONARDOS & CIA
1919 INTELLECTUAL PROPERTY CONSULTANTS

1200

Search | Fulfillment | Routine | Related Sites | Downloads | Help

1202
- Trademark
- Figurative
- Pasta F
- Pasta O
- Trademark in other country
- Patents
- Client
- Extern Owner
- Intern Owner
- Debit Note
- Rpi pages Página carregada Iniciar | Intranet–Momsen, L... | different (predefind) sectio... | Vírtua–Microsoft Internet ... | 13:41

FIG. 12B

![Screenshot of SubClient Search interface]

Intranet-Momsen, Leonardos & Cia
Diversos Institucionais Consultas Cadastramento Rotinas Email Navegação Sair SubClient Search
Select

1225

Select [Name ▽] [Contains ▽] [finnegan]  [Find]
                                          [Add]

☐ Select all option of SubClient Search, where:

Order by [Name ▽]  ⦿ Ascend   [Add]
                   ○ Descend

Order by: ────────── Order ──────────

[EXECUTE SUBQUERY] [LAST QUERY] [MENU]    [HELP]

[Decisions Code]   [Class]   [New Class Prod/Serv]

── Query ──
⦿ Personal  ○ Public
Personal [No query was saved! ▽]    [Open Query]
Personal [No query was saved! ▽]    [Delete Query]
Personal [                    ]     [Save Query]

── Open/Save/Delete Queries ──

Página carregada

Iniciar | Intranet-Momsen, L... | Google Search: firm client... | imagem-Paint                12:23

FIG. 12E

Intranet-Momsen, Leonardos & Cia
Diversos Institucionais Consultas Cadastramento Rotinas Email Navegação Sair Customers Found 9      Page 1 of 1

| | Code(TM)–Name | Language |
|---|---|---|
| ☑ | 00416– MORGAN & FINNEGAN, L.L.P (Trademark) | English |
| ☑ | 09197– MORGAN & FINNEGAN, L.L.P (Trademark) | English |
| ☑ | 00416– MORGAN & FINNEGAN, L.L.P (Patent) | English |
| ☑ | 01138– MORGAN CONSTRUCTION COMPANY (Trademark) | English |
| ☑ | 01138– MORGAN CONSTRUCTION COMPANY ATT: MS. PETRA TEMPLIN (Patent) | English |
| ☑ | 11454– MORGAN MARKENARTIKEL VERTRIEBSGESELLSCHAFT MBH | English |
| ☑ | 06284– MORGAN, LEWIS & BOCKIUS LLP (Trademark) | English |
| ☑ | 10692– MORGAN, LEWIS & BOCKIUS LLP | English |
| ☑ | 07089– MORGAN, LEWIS & BOCKIUS LLP (Trademark) | English |

1230

⊙ This Page   ○ All Pages    Check   Uncheck   New    |<<   |<   1   >|   >>|

Select Report    SubQuery    HELP     Back to Client Search

Intranet—Momsen, Leonardos & Cia

Diversos Institucionais Consultas Cadastramento Rotinas Email Navegação Sair

All/New PGI

| | Subject | | |
|---|---|---|---|
| ☐ | PGI Marca | Contacts | PGI Trademark |
| ☐ | PGI Busca | Contacts | PGI Search |
| ☐ | PGI Direito Autoral | Contacts | PGI Copyright |
| ☐ | PGI Patentes | Contacts | PGI Patent |
| ☐ | PGI | Contacts | PGI |
| *New | | | |

1260, 1262, 1264

Domain Name
Domain Name
PGI
PGI Copyright
PGI Patent
PGI Search
PGI Trademark
school
New PGI Type Add  Cancel   1263

HELP

1<<   Previous Page   >>9

☑ Selected to Report

Print

Página carregada

Iniciar ... Intranet—Momsen, L... Google Search: firm client ... different (predefind) sectio... 12:44

FIG. 12L

SYSTEM AND METHOD FOR PROVIDING INTEGRATED MANAGEMENT OF ELECTRONIC INFORMATION

This is continuation of application Ser. No. 09/729,654, filed Dec. 4, 2000 now U.S. Pat. No. 6,778,972.

BACKGROUND OF THE INVENTION

1. Field of the Invention

This invention relates to a method and system for integrated management of information, and more particularly to a method and system for integrated management of information in a computer-readable format that can be used over the Internet and similar communication means.

2. Description of Related Art

In a strictly paper-based environment, information relating to clients, customers and/or projects, such as documents, tables, graphics or facsimiles are generally arranged in some organized fashion and indexed for future reference in a folder by making use of a paper filing system, which is common in most offices. While paper-based systems may be common, because of the large number of documents relating to different clients, projects and matters, these paper-based systems may be rather large and bulky to deal with.

With the advent of computers, the usage and reliance on electronic information has become an ordinary fact of life. Furthermore, it is also becoming common to use the Internet and/or the Intranet to bring together more than one user for working together on common computer applications. With computer usage becoming increasingly common, more and more data is being generated and electronically stored. Often the data is stored randomly, which causes users to encounter difficulty in attempting to retrieve the stored computer-readable files.

In addition to computer usage, usage of different and various means of telecommunications are also becoming popular. The lines between telecommunications and computer usage are blurring, however. It is not uncommon today to use a computer for telecommunication purposes, and also as part of one's multimedia setup for watching movies or listening to music. For example, sending and/or receiving of facsimiles of documents on one's computer hard-drive, communicating by voice over the Internet, making and receiving phone calls, listening to music on the Internet or stored locally, and watching live events simulcast on the Internet as well stored films are some of the frequent uses that computers are being utilized for. Of course, the use of computer for communication purposes also leads to generation of data and other related files, which must be stored in such a manner that they can later be retrieved in an easy manner.

With the drive for computerization, there is a growing trend to use our computers for as much office work as possible. Consequently, it is not uncommon to see computers with stored documents, reports, spreadsheets, images and drawings, facsimiles, emails, multi-media files and databases that relate to existing clients, customers and/or projects. Unfortunately, having a large number of clients and projects makes it difficult to keep track of all their associated files, documents and/or other pertinent information. Often times, because of the large number of files, it is an impossible task to keep track thereof. Even when one is successful in finding and/or retrieving existing files, the time taken to track down the desired file, document and/or other pertinent information may be prohibitively large.

The problems of managing these associated paper or computer-readable files become even more acute where one has to ensure their security by restricting their access to an appropriate group of people.

Users often attempt to use a document management system for managing their documents, which are stored as computer-readable files. Unfortunately, these document management systems operate by creating a separate application software that requires users to actively manage the stored files by knowing some detail about the computer files. In other words, there is generally no provision of going through all the contents to find and retrieve one or more desired files.

Furthermore, existing systems do not allow the user to effectively find files that are not computer searchable, such as when the files are faxes, images or voice mails which are also part of the contents of an electronic folder. In other words, document management systems fail to allow the user to have the entire history of a folder (its entire content) of a particular or desired client, customer, or project, as the result of a search. This is disadvantageous because the history of the folder (i.e., the information of all files created and saved on a subject, including the filed that are not searchable) may be necessary to act on desired file(s).

In addition, searching for files with existing systems in difficult, because the searches often result in files from different folders being listed together as the search result due to similarities in their file histories and common elements in their identifying information. Thus, a file search could bring a result mixing files from separate folders of different or undesired matters, and prevent the correct understanding of the history of the folder to which a desired file really belongs.

Furthermore, existing document management systems do not allow multiple users to simultaneously access and create documents listed in a DBMS. As a result, it becomes necessary to create multiple copies of a file to allow access to multiple users.

Because of all these disadvantages, there is a need for a system which allows individuals as well as organizations to efficiently manage electronic information on computers. There is also a need for a system that facilitates storage of computer, files in a manner that simulates the storage of actual folders and files so that a user does not have to actively manage the stored files. Additionally, there is a need of having a unified system and method for structured classification, creation, storage, management, communication and retrieval of electronic information and data stored in a DBMS. Furthermore, there is a need for a system that allows users to store their computer files in a manner that is easy to organize for later retrieval and usage, and which simulates paper folders (herein called electronic folders or e-folders) and also allows searching of these folders using the full capabilities of a DBMS.

SUMMARY OF THE INVENTION

The present invention overcomes the above-mentioned disadvantages. One aspect of the invention provides a system for maintaining an efficient management of electronic information on a retrievable media, such as a computer hard drive. The invention comprises a server, which is user-friendly and has an integrated management system and method for structured classification, creation, storage, management, communication and retrieval of electronic information. The system simulates the old-fashioned paper filing system based on the user of paper folders, common in most offices, and does not require a change in the way users create, use and manipulate the stored electronic information.

The system is based on a single user-friendly interface that includes workflow and work-groups capabilities. The integrated management system is provided with search capabilities, such as a query builder that spans over multiple electronic information media, such as emails, files, data stored in databases, faxes, voicemails stored as files and the like.

The integrated management system is capable of managing, creating, searching, communicating and retrieving all incoming and user generated electronic information simultaneously. The users are allowed to search data in DBMS, which may be stored as mailing lists, payment sheets, inventories and the like, files created locally by computerized devices such as a Personal Computer (PC) applications, emails, voicemails and faxes and calendar.

BRIEF DESCRIPTION OF THE DRAWINGS

FIG. 12A-12L are screen-shots for one embodiment of the system of FIG. 1.

DETAILED DESCRIPTION

Figure 1A:
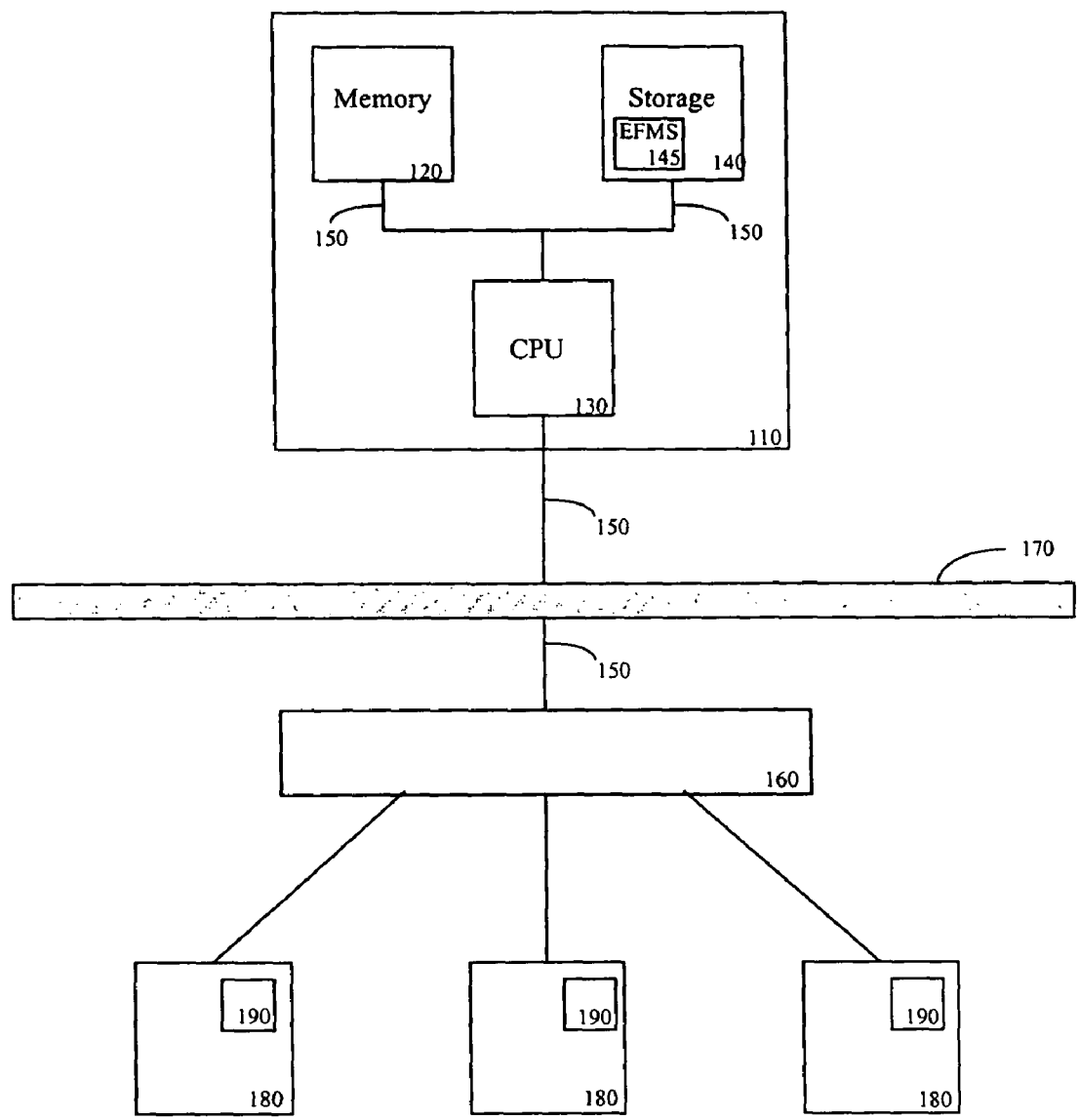
FIG. 1A is a schematic block diagram depicting the system of one embodiment of the present invention.

The present invention relates to a system and method for storing and managing digital and paper content, for one or more users. The content may comprise documents, files, electronic mails (e-mails), facsimiles, voicemail, video, data files created in word processors, spreadsheets, CAD, and other applications, as well as data stored in SQL servers, DBMS, databases developed for workstation and/or LANs environment, and/or other relevant information that is stored in a computer-readable format in a central location. It should be noted that this description discloses an electronic folder management system, which stores content that may be referred to as documents, files, or other relevant information interchangeably, which should not be used to restrict the scope of the present invention.

The electronic folder management system may be accessed and used by a plurality of users simultaneously. The electronic folder management system comprises a plurality of databases for storing information on users, files, electronic mails, facsimiles, search parameters, and the like. The electronic folder management system also includes a software to manage the plurality of databases. As the following discussion will illustrate, the present system allows users to create and manage electronic folders that simulate paper folders used in offices, and links and maintains a record of all the users' documents and files stored on the server. The present invention allows users to access any of their files from their electronic folders, and users can move between any of the files. Furthermore, the management system includes an electronic mail (e-mail) client that receives and sends e-mails, and organizes them into a format that may be directly accessed from the user's electronic folder. Furthermore, the electronic folder management system also includes a facsimile client that receives and sends facsimiles, and organizes facsimiles into a file format that may be directly accessed from the user's electronic folder.

The present invention may be used in a public or a private setting. One typical example is in an office setting. In this implementation, the users are allowed to enter information on the screen for their electronic folder so that the screen simulates an actual cover of a paper folder that generally has identifying information regarding the electronic folder's contents. The entries on the screen facilitate the searching and sorting of the contents of a user's folders and their contents. For example, a user may search for all files and/or documents that were inserted in his folder after a given date, or the user may search for documents relating to a particular topic, and the like. By using the information on the start screen, the present invention searches a central database and retrieves a list of the contents belonging to the user's electronic folder and satisfying the search criteria.

According to one embodiment of the invention, the user is able to sift through the listed contents by merely clicking the next document button on the screen, which is similar to sifting through documents in a paper folder. As is obvious, this embodiment is highly beneficial in that it allows users to sift through only those documents that satisfy their search criteria, as compared to having to turn through all pages in the case of a paper folder.

With reference to the figures, various embodiments of the present invention will now be described in greater detail. It is to be understood that the tasks shown in the figures and described in this description can be sequenced in many different orders to achieve the desired result. For example, depending on the implementation, it is possible that key words can be received prior to receiving the content. The order or sequence of tasks illustrated in the figures is merely intended to be exemplary of the concepts defined herein. FIG. 1A provides an illustration of a system in accordance with the present invention. The invention comprises a computerized method and system for integrated management of electronic information, wherein clients use a client program to connect to the server to access and use their electronic folders and the content stored therein.

Shown in the FIG. 1A is a central server 110 that forms the backbone of the present invention. The server 110 comprises a memory unit 120 and a central processing unit (CPU) 130. The memory unit 120 serves as the electronic holding place for instructions and data that the CPU 130 can reach quickly for processing. The CPU 130 is the central unit in the server 110 containing logic circuitry that performs the instructions of resident programs that drive the server 110. It should be noted that the server 110 is not limited in its form, and may be a network of computers, a distributed system, a mainframe computer, a web site and other related computer systems implementations. Furthermore, the server 110 may be provided with a plurality of computers, where one computer is used to allow access to the system and method of the present invention and the remaining computers house and power the system and method of the present invention. It should be noted that many different configurations of a server 110 are contemplated as being within the spirit of the present invention.

The CPU 130 is connected to a storage unit 140 by a connection means 150. Depending on the implementation, connections means 150 may be a data path, which is also known as a bus. Storage 140 contains an electronic folder management system 145, which is configured to store information about users and users' documents and/or files. According to the invention, the storage capacity of the storage 140 can be expanded to allow an increase in the amount of data to be stored therein. It should further be noted that the storage unit 140 is not limited in its form, and may be a hard disk, a floppy disk, a CD-ROM, or a tape backup system.

In one implementation, the server 110 may be provided with one or more communication means 160 that are connected to the CPU 130 by connection means 150. The scope of the present invention is not limited by the choice of communication means 160 employed. Accordingly, it is possible to use a modem, a DSL, an ISDN, a cable modem or any similar device to allow a remote user to connect with the server 110 and communicate therewith. Furthermore, the scope of the present invention is not limited by the number of communication means 160 utilized by server 110.

According to the invention, at least one user 180 may connect to the server 110. The users' systems are generally termed as clients. The users may connect to the server by dialing in, using a simple telephone line, an Integrated Services Digital Network (ISDN) line, a cable modem line, an electronic data link, optical fiber connection, wireless data connection or any other known connection used for data transfer over the Internet or an Intranet. Alternatively, the client/server architecture of the electronic folder management system can be designed as a Local Area Network (LAN), a Wide Area Network (WAN) or the like. Depending upon the implementation, the connections can provide one or more modes of transmission, such as radio frequency transmissions, optical transmission, microwave transmission, digital or analog transmission, or other known data transmission.

The client 180 is provided with a client program 190 which is used to access the user's account in the server 110. The user 180 is able to dial into server 110 and access his folder using the client program 190. According to one embodiment, the client program 190 is a browser which is used to navigate to a web site that houses the server 110, and the server's contents may be accessed using the browser. The CPU 130 processes the activities of the clients dialing in and allows the appropriate access to the electronic folder management system 145. The electronic folder management system 145 is updated and stored in the storage unit 140 for later usage.

The server is protected by various means for computer security, including a firewall 170 that may be provided between the communication means 160 and the server 110. It should be noted that various security measures are contemplated within the scope of the present invention to ensure that the contents of the server 110 are fully secured.

Figure 1B:
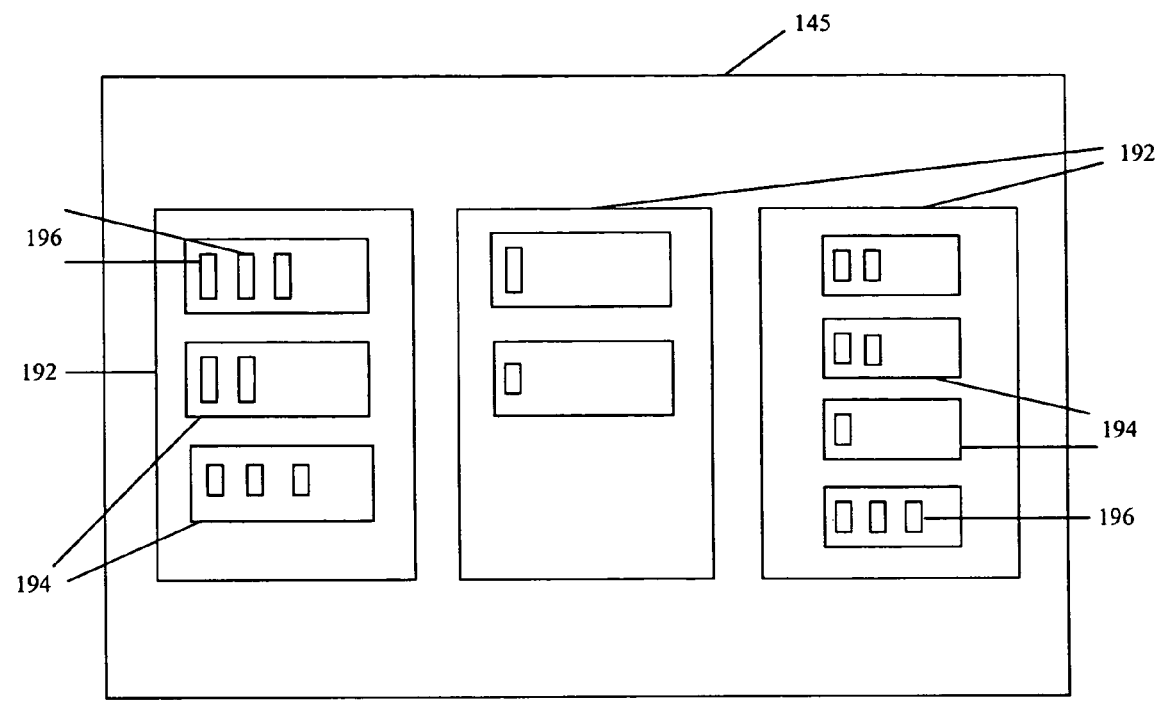
FIG. 1B provides a depiction of the various components in the electronic folder management system of the present invention.

FIG. 1B provides a depiction of the various components in the electronic folder management system 145 of the present invention. As noted above, the electronic folder management system 145 simulates the storage of actual paper folders and paper files and documents so that a user does not have to actively manage the stored files. The electronic folder management system 145 comprises one or more electronic folders 192. The electronic folders 192 simulate the look and feel of a paper folder that contains a plurality of papers documents therein. Each electronic folder 192 is divided into one or more sections 194. Each section 194 may correspond to a different topic or subject, and may be used to divide the contents of the electronic folder 192. Within each section 194, the user may store one or more computer-readable files 196. Each of the files 196 may represent an e-mail, a word processor document, a spreadsheet, a audio file, a video file or any other computer-readable file.

Figures 1, 1C:
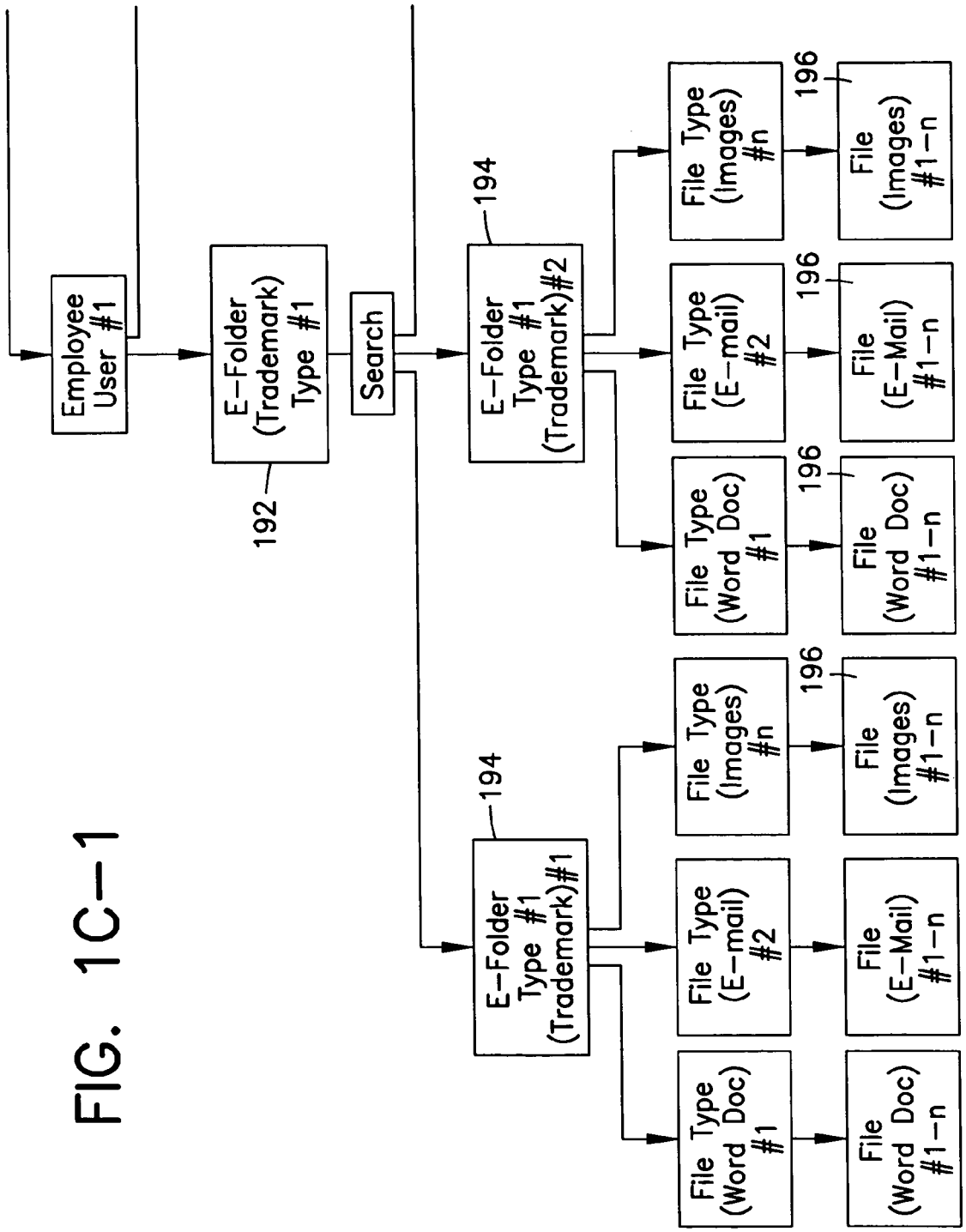
FIG. 1C provides a depiction of the electronic folder management system in use by a plurality of users.

FIG. 1C provides a depiction of the electronic folder management system 145 in use by a plurality of users, wherein the electronic folder management system 145 is being utilized by a law firm that is involved in the practice of intellectual property (IP) law. As shown in FIG. 1C, an electronic folder 192 may be associated with one or more users, where each user has user-privileges to use the underlying electronic folder 192.

The various electronic folder 192 may correspond to trademarks, trademark opposition, litigation, patents, or the like. Each folder 192 may further comprise one or more sections 194, which may correspond to different clients, different trademarks, different countries or the like. Finally, each section 194 contains a plurality of files 196 of various different types. The file types may include Microsoft® Word documents, images, e-mails, or the like.

Figure 2A:
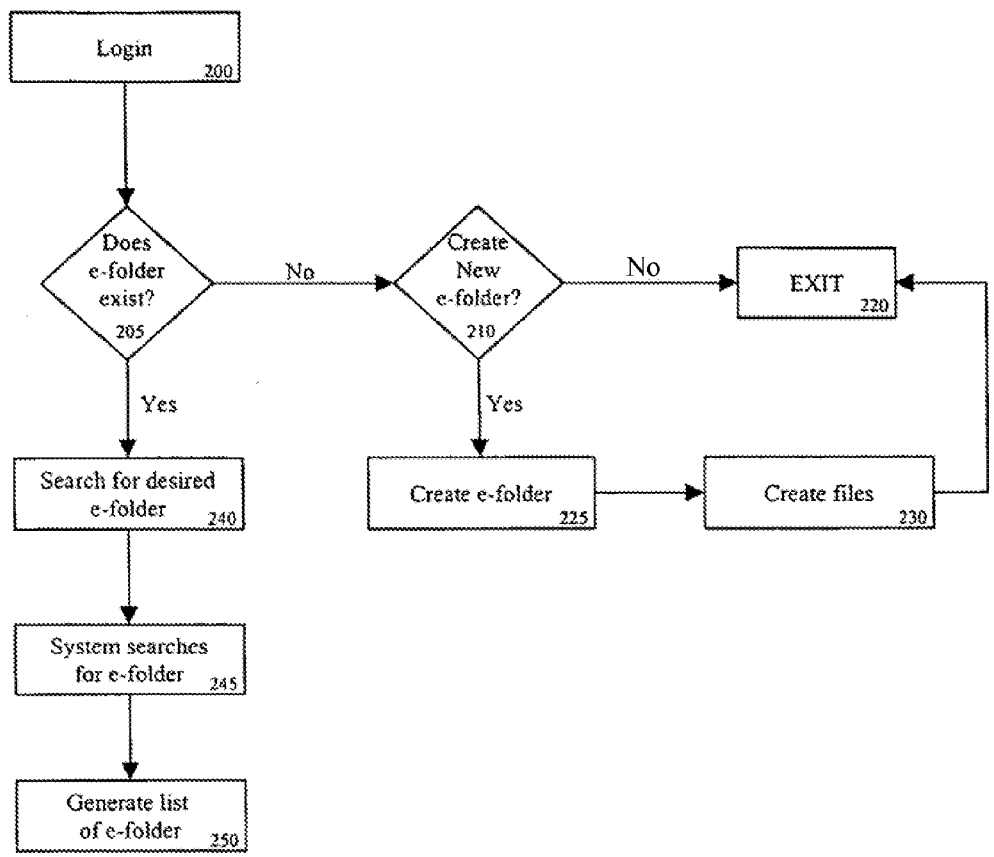
FIG. 2A-2B are schematic flow diagrams illustrating general usage of the file management process within the system of FIG. 1.

FIG. 2A provides an overview of one embodiment of using the electronic folder management system of the present invention. Since the invention relates to a computerized system for maintaining records, documents, and all other information and contents in a computer-readable format, the method essentially enables the creation, modification and/or use of the contents, in the form of files, in the electronic folder 192 of the present invention.

At step 200, a user logs into the system by providing the appropriate identifying information. As noted above, the user is able to navigate to the system by merely directing its client program 190 to the server 110, or if the user is using the system locally then by merely starting the software implementing the present system. Once the electronic management system is fully loaded, the user is able to enter the identifying information for being able to log into the server 110.

At step 205, the system checks to see whether the user has a pre-existing electronic folder. As noted above, the electronic folder simulates the look and feel of a paper folder that contains a plurality of papers documents therein. If the user does not have an existing electronic folder, the user is presented with a choice of creating a new electronic folder, as shown in step 210. If the user does not elect to create a new electronic folder, the user is logged off the system, as shown in step 220. On the other hand, if the user elects to create an electronic folder, the user is provided with the appropriate screen having a blank cover page for the electronic folder in step 225. The user enters all the pertinent information on the cover of the electronic folder. The information may not only be used to identify and label the folder but also to provide assistance when the user later seeks to search for a given electronic folder out of many other existing folders, or wishes to retrieve documents stored in the electronic folder management system. Once the user has entered the pertinent information on the cover of the folder, the system creates an electronic folder therein, and the user may create one or more files to be stored therein, as shown in step 230. Upon successful creation of the electronic folder and its included files, the user may print and/or send the file by e-mail or facsimile, or the user may log off the system, as shown in step 220.

However, if, at step 205, the user has an existing electronic folder, the user is provided with an opportunity to search for the desired electronic folder out of the many electronic folders stored in the electronic folder management system, as shown in step 240. The user enters the search criteria, and then the system searches for the folder(s) that satisfy the search terms entered, as shown in step 245. Finally, in step 250, the system generates a list of the electronic folders that satisfy the search terms entered.

Figure 2B:
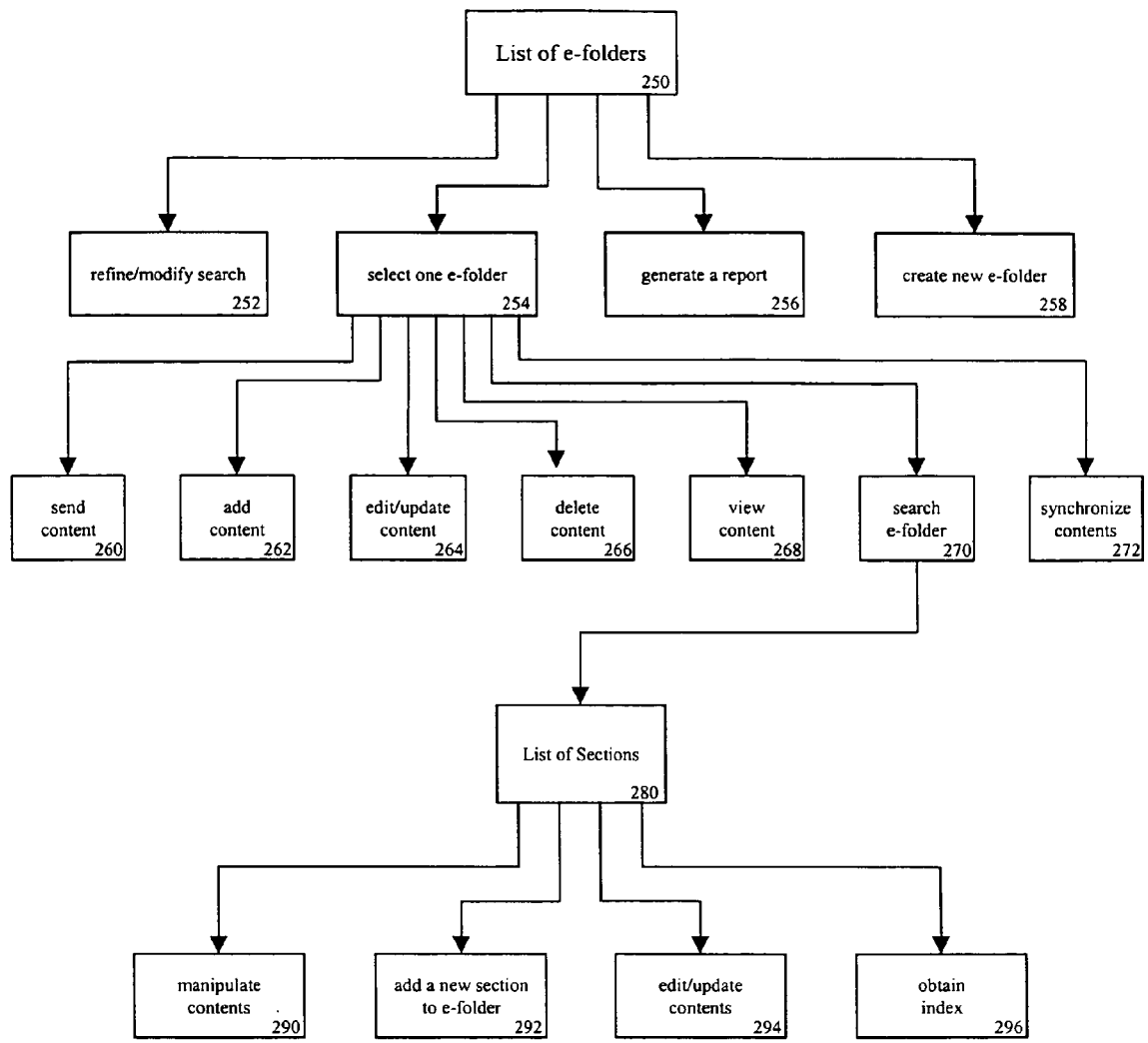
Figure 3:
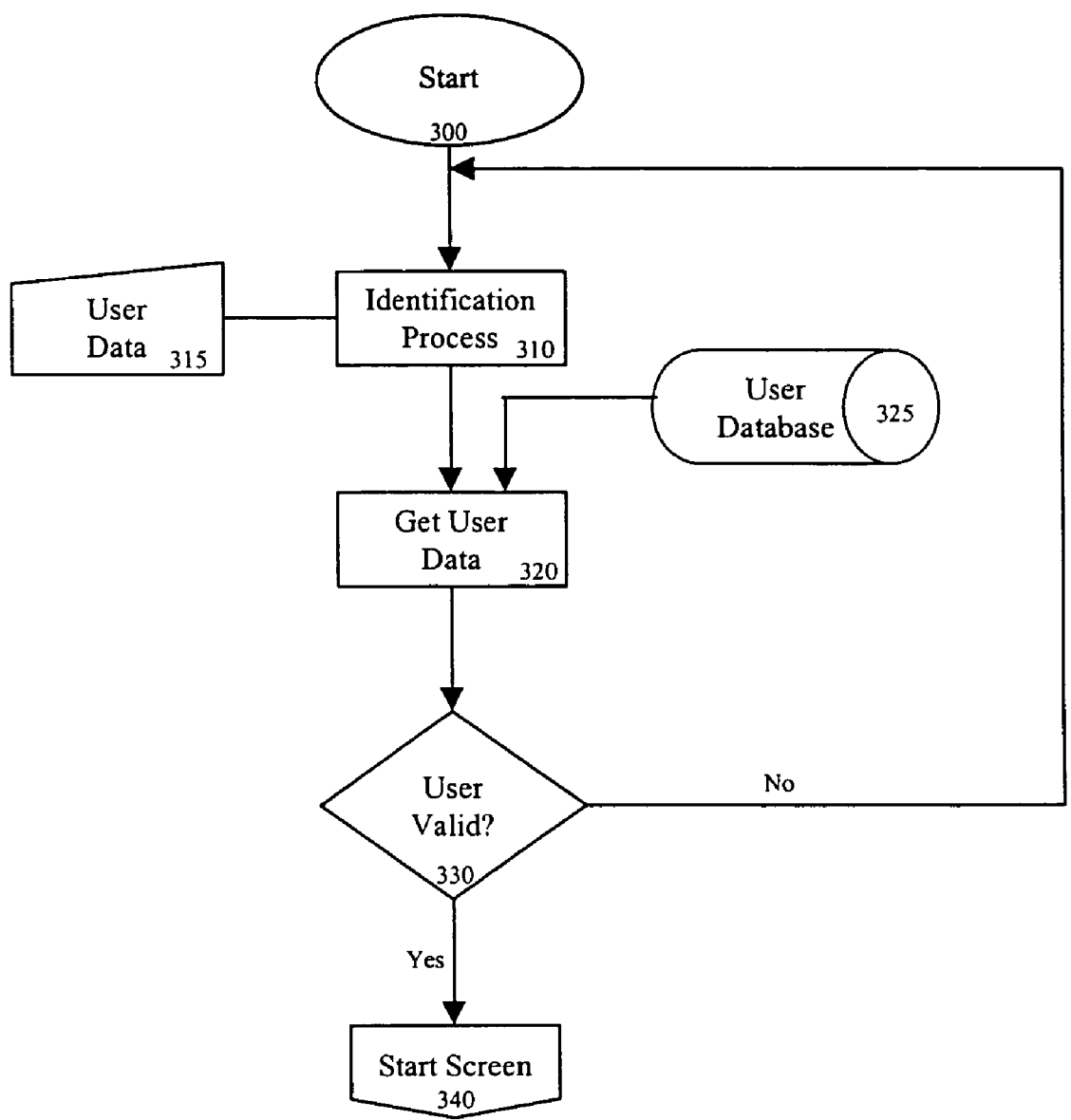
Figure 4:
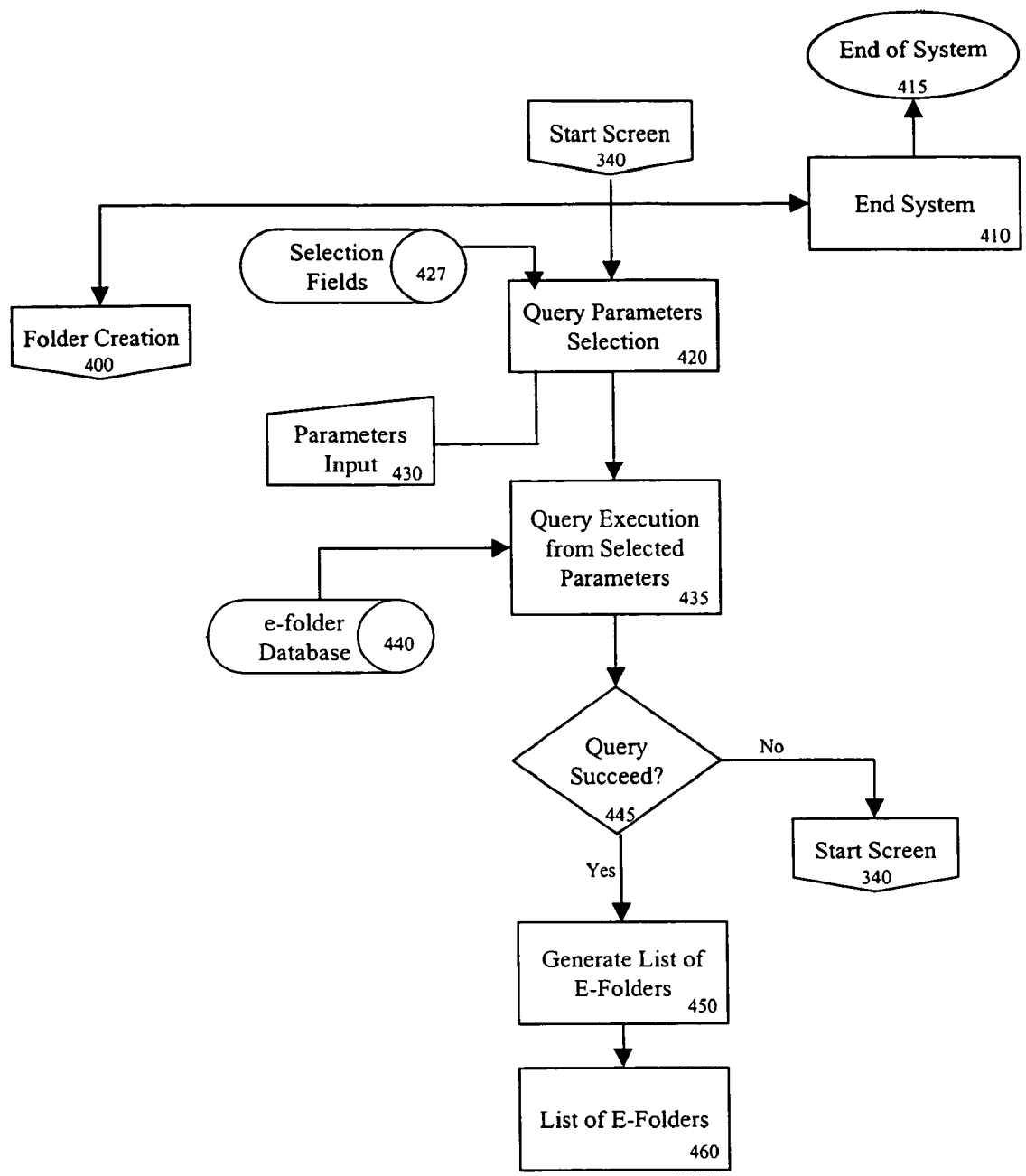
Figure 5:
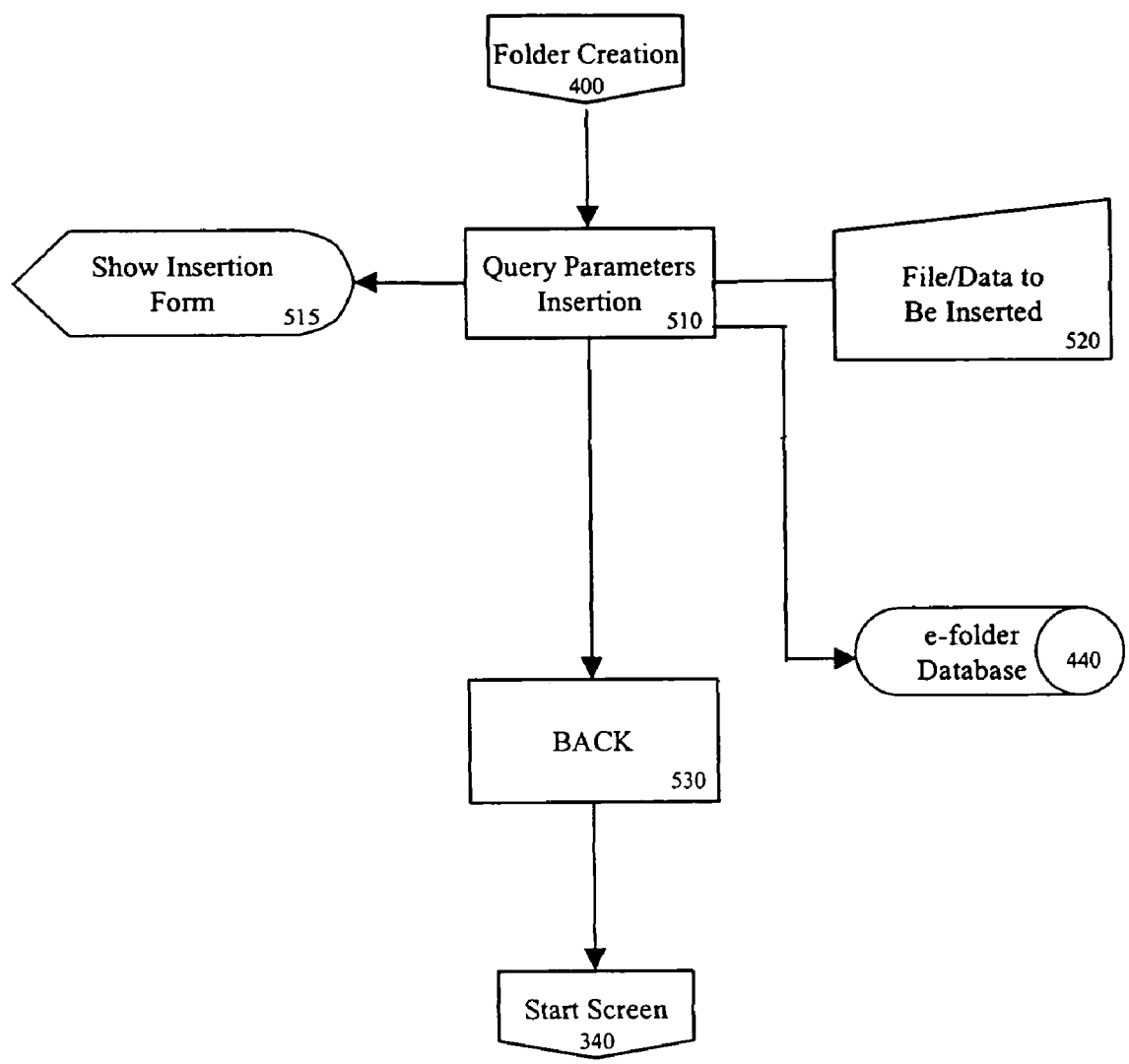

FIG. 2B provides an overview of the actions that may be performed on the contents of the electronic folders. As noted above, at step 250 the user is provided with a listing of electronic folders that satisfy the search criteria for the search initiated in step 240. Should the user wish to narrow the search that yielded the list of electronic folders in step 250, the user may do so in step 252 by modifying and refining the search terms. The electronic folder management system also allows a user to select one electronic folder out of a plurality of folders listed, as shown in step 254, for performing one or more operations thereon, which will be discussed in more detail below. At step 256, the user is provided the ability to generate a report for the listed electronic folders. The user may choose the electronic folders that are to be included in the report, or the user may simply create a report that includes all the listed electronic folders. According to the invention, the user may generate the report in a print format, file format or the like. The user may print a summarized version of the report where each electronic folder is described in one or two lines, or a detailed version that includes a detailed summary of one or two electronic folders per page.

In addition, the electronic folder management system allows the user to create a new electronic folder for a new client, customer, transaction, or for any other purpose for which the present invention is utilized, as shown in step 258. As noted above, the user is able to perform a variety of operations on individual electronic folders by selecting the pertinent electronic folder. Where the user selects a folder, he is provided with a new screen which has a plurality of options listed thereon. Some of the options contemplated within the spirit of the present invention will be discussed in more detail below.

The user is provided with a list of files in the electronic folder, once the user opens the electronic folder. The user is able to select files from the electronic folder by merely clicking with a mouse or a similar/substitute device on the desired file or document on the list of files. Alternatively, the user may type in the name of the sought document and perform a search on the contents of the electronic folder; the electronic folder management system searches the file database and lists the contents that satisfy the search criteria. Since the contents of the electronic folder are stored as distinct computer-readable files, any discussion pertaining to files should be construed to include any and all types of computer-readable content stored and listed in the electronic folder management system.

At step 260, the electronic folder management system allows the user to select one of the files listed in the electronic folder and send it to another person via e-mail or as a facsimile. At step 262, the user may create a new file, which could be a document, an image, an e-mail, an audio-visual file or the like, and save it within the electronic folder. At step 264, the user is allowed to select a file from the electronic folder and make changes thereto by editing and/or updating it. The user may also delete an existing file from the electronic file, as shown in step 266. The user may also view a file from the electronic folder, as shown in step 268. According to the invention, when the user attempts to view a file, the system opens the appropriate application for enabling view of these files therein. For example, if the file is a Microsoft® (Word document, the system will launch Microsoft® Word to enable the user to open the file therein. At this point, the user can simply view the document or make changes thereto. It should be noted that the present system allows more than one user to access a file at a given moment, where the only one user is allowed to make changes to the file, while the rest of the users can access the file in a read-only mode.

At step 270, the user may search the contents of the electronic folder for a particular file if the user does not wish to browse through all the listed files and/or documents. The user is also able to save a copy of a file on the local drive from the server 110, as shown in step 272. According to the invention, the user may also be able to upload a file from a local drive into the present electronic folder management system.

The user may perform a search on the contents of the electronic folder, as shown in step 270, which causes the system to generate a list of files in step 280 that satisfy the search criteria. At step 290, the user may select the contents from the list generated in step 280 and manipulate one or more of the files listed therein.

The electronic folder may be provided with one or more sections to compartmentalize the contents of the electronic folder. Thus, at step 292, the user can add a new section to the electronic folder. At step 294, the user may select a file from the list generated in step 280, and make changes thereto by editing and/or updating the file. At step 296, the user may obtain an index of all the contents in the electronic folder with which the user is working.

Figures 1, 1C, 2, 3:
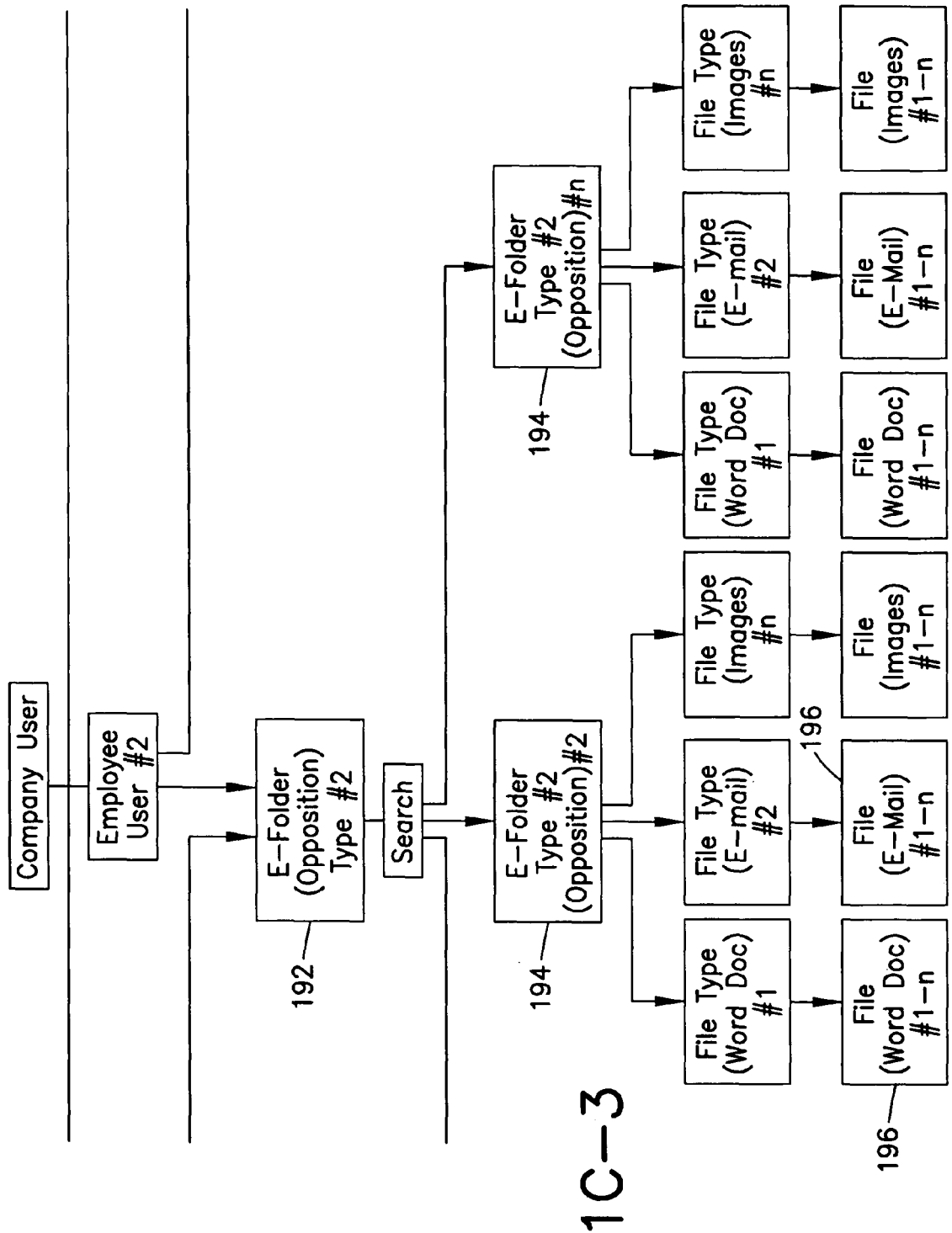
FIG. 3 is a schematic flow diagram depicting the steps for login into the system of FIG. 1.

FIG. 3 provides an overview of the login process by the user identifying himself or herself to the electronic folder management system, mentioned earlier in step 200. The user name identification provides the system with information about the user. This information is relevant for validating the user to protect the data from hacking and unauthorised access, for providing privacy, for customising the screens, tables, forms, reports, as well as all other features for a particular user, setting the permission levels for the user if he or she is part of a group of users with multiple levels of privileges, such as write, delete, impute data and delete data, and to provide user driven management.

At step 300, the user navigates to the server 110. As noted above, if the user is connecting from a remote location, the user merely points its browser programs to the server 110. At step 310, the user is provided with a screen to enter its validation information, and user enters identifying information in the form of user data 315. At step 320, the system accepts the user data 315 as input and compares the user data 315 with the data stored in a user database 325. The user database 325 comprises a master list of all the valid users of the present system, and any and all of their identifying information.

At step 330, the system checks to determine if the user is a valid user who has the appropriate user privileges. If the user provides the correct information and has appropriate user privileges, the user is allowed into the system and provided with a start screen 340 for the user's collection of electronic folders. This start screen 340 simulates the appearance and functioning of a collection of paper folders. If the user is not validated by the system, the user is sent back to reenter the identifying information at step 310.

Figures 1, 1C, 2, 3, 4:
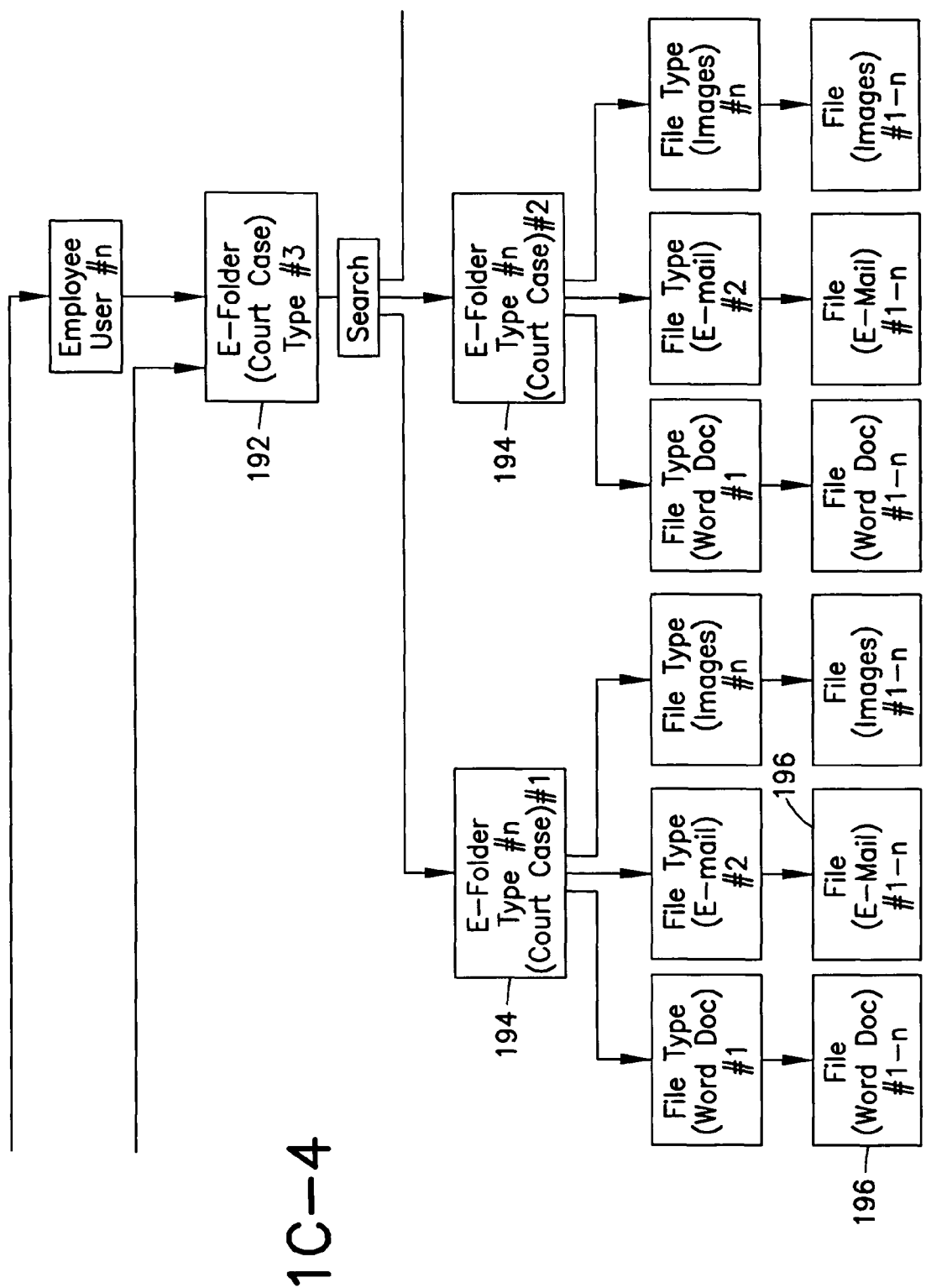
FIG. 4 is a schematic flow diagram depicting the steps for retrieving the desired electronic folders in system of FIG. 1.

FIG. 4 provides an illustration of various operations that can be performed on the start screen 340, according to one embodiment of the present invention. Where the user does not have any electronic folder created, or where the user wishes to create a new electronic folder, the user may do so in step 400, which will be discussed in more detail below. If the user was validated by the system in step 330 and has already inserted information on the cover of his or her electronic folder, the electronic folder management system allows the user to proceed further. According to the invention, the cover is user interface that is provided with identifying information regarding the electronic folder, wherein the information is also displayed to the users.

Since the present system is an Internet-based electronic folder management system for integrated management of electronic information by means of associating each piece of electronic information to data stored in the central databases, the start screen 340 is the "central gateway" for the use of the invention. The importance of the operations on the start screen can be described as follows: because all pieces of electronic information must be associated to a user defined cover of the electronic folder, the system only allows input, output or deletion of electronic information if the information is associated to the cover of the electronic folder.

Should the user wish to exit the system, the user may do so in step 410, and the system pushes the user out therefrom in step 415. At step 420, the user is allowed to provide an input of parameters 430 to search for a desired electronic folder or file. The user is able to use all the fields previously defined on the cover of the electronic folder to search for a specific electronic folder or file. The user is also able to use all fields previously defined on the cover to generate reports containing data entered in the fields of the cover of the electronic folder. The query/search parameters used to filter and sort the electronic fields can be applied to any or all fields, in any user-defined hierarchy. The parameters selected or entered by the user are visible on a display unit. According to another embodiment, the user may also select the parameters relating to the desired electronic folder from a selection of pre-defined parameters.

At step 435, the system executes the query corresponding to the search initiated by the user in step 420. The system searches the electronic folder database 440 to obtain the results for the query of step 435. According to the invention, the query gives the user the option of searching in two different manners: simplified search, and multiple parameter search. The simplified query is based on a single or very few parameter(s), and is intended to be used by users that already know the electronic folder that is to be opened. The simplified query enables the user to quickly locate any specific "electronic file" that he or she knows by a very specific string. The result of a simplified query will usually be a single electronic file or a small number of electronic files that can be browsed/navigated.

The multiple-parameter query givers the user the ability to search multiple parameters, fields and search criteria. It is a powerful query builder intended to find electronic folders or for generating reports based on submitting several broad parameters to a query that will return the intended information after applying all parameters given by the user. The multiple-parameter query enables the user to do extensive and comprehensive searches on the contents of the electronic folder management system.

At step 445, the system checks to determine whether the query of step 435 was successful in resulting in a list of one or more electronic folders. If the query does not yield any electronic folders, the user is sent back to the start screen 340 to reenter parameters to redo a new query. On the other hand, if the query is successful in yielding electronic folders, in step 450, a list of the resulting electronic folders 460 is generated. If the query returns a valid result, then the system has two ways of displaying the result: individual result list, and summary list.

If the query returns a single valid result or a list of possible individual results, the individual result list mode of visualisation may be used. The user is able to see the individual result that shows all fields on the cover of the electronic folders. On the other hand, the summary list shows specific pre-defined fields to each electronic folder in order to show to the user a large number of electronic folders per screen.

Figures 1, 1C, 2, 3, 4, 5:
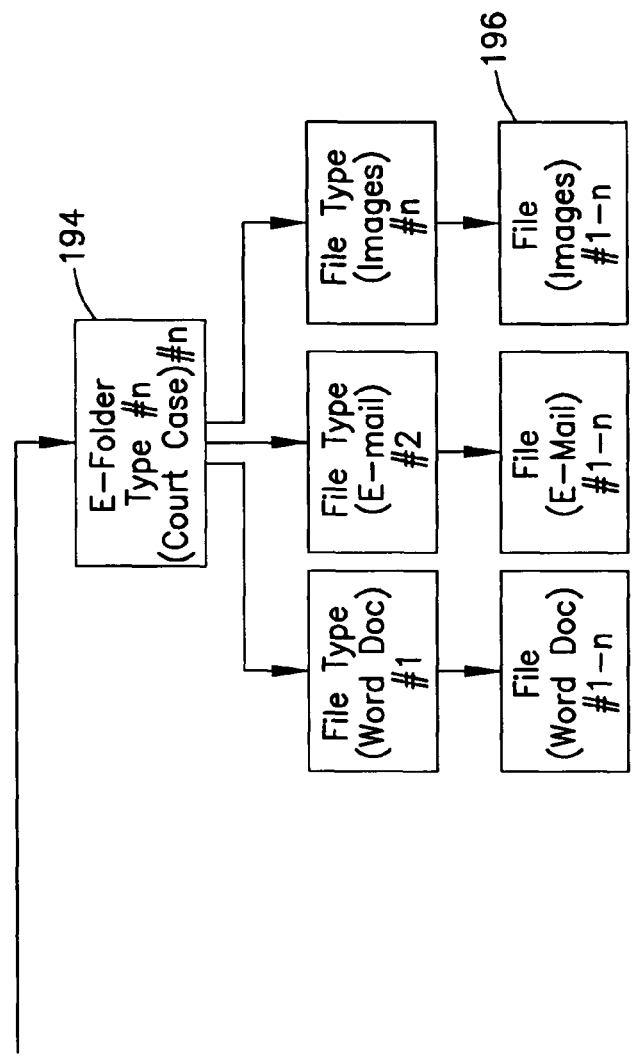
FIG. 5 is a schematic flow diagram depicting the creation of an electronic folder for the system of FIG. 1.

FIG. 5 provides an overview of one embodiment of creating a new electronic folder. As mentioned above, the user may decide to create an electronic folder in step 400. At step 510, the system provides the user with an user interface in the form of a blank form 515 that is filled by the user to describe the purpose and the identifying information for the electronic folder being created. The blank form 515 simulates the appearance of a paper folder's cover, where users enters the information pertaining to the contents of the folder. Furthermore, once the folder's identifying information has been provided, the user may also import in or upload files and/or other data 520 that the user wishes to place in the electronic folder 192. The identifying information entered is stored in a electronic folder database 440 so that the stored information can later be used to retrieve and search for the electronic folder being created. At this point, the user may also create one or more files that will form a part of the electronic folder. The files are stored in a file system or database.

At step 530, the user selects the option to return to the main screen, which the system allows by returning to the start screen 340.

Figure 6:
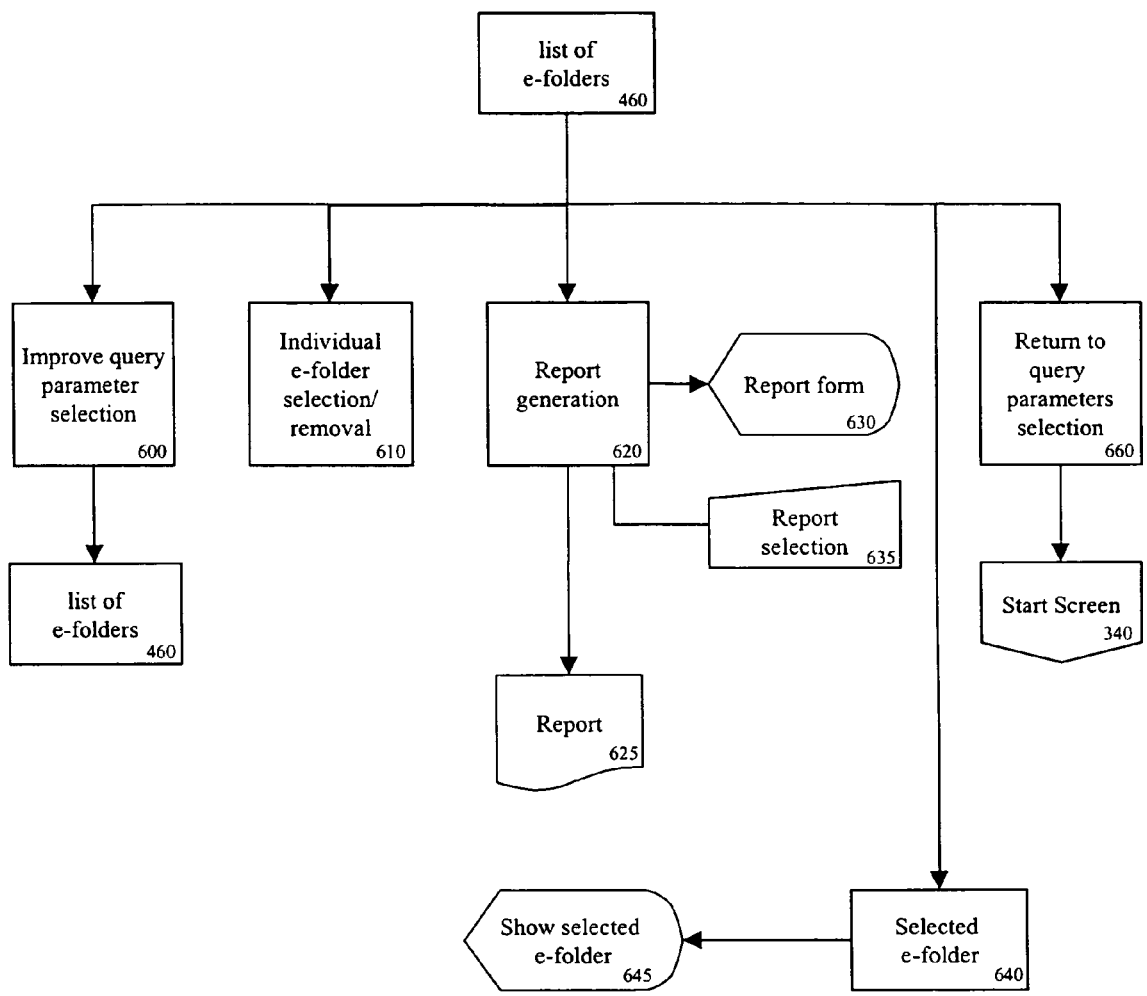
FIG. 6 is a schematic flow diagram depicting the various operations that may be performed on the list of electronic folders 460 generated by the process of FIG. 4.

FIG. 6 provides an overview of the plurality of actions that may be performed on the list of electronic folders 460 generated in step 450. It should be noted that the present system provides a new and useful means for searching and narrowing down results showed in the summary list by running other queries only at the result showed at Summary list. The system allows a user to individually select each electronic folder by manually marking each of them for performing particular actions thereon. If the user obtains a list bigger than he or she wants, the user may modify the query or refine the search in step 600 to retrieve a modified list of electronic folder 460.

At step 610, the user is allowed the option of selecting and then removing the selection of the electronic folder. According to the invention, once the electronic folder is removed, the system will not list the electronic folder in response to queries of step 450 or step 600.

After having accepted the pre-defined fields or using customised fields as a means for associating each piece of information on the cover of the electronic folder to the files stored in an electronic folder, the user can also create customised reports of the information stored in these fields. Thus, the user can make use of the data stored in the system to generate customised reports that facilitate in the management of electronic folders and also in the management of the files in the electronic folders.

At step 620, the user may generate a report 625 of the list of electronic folders 460. The system provides the user with a report selection screen 635 that may be utilized to choose from a plurality of report styles. The user makes the appropriate entries to indicate the desired report form in a report generation form 630. As noted above, the user may have a summarized report or a detailed report, within the scope of the present invention.

At step 640, the user selects one of the electronic folders in the electronic folder list 460. The system shows the contents of the cover of the selected electronic folder 645, upon which a plurality of actions can be taken, as described in more detail below. At step 660, the user selects to return back to the start screen 340 to re-run a new query search.

Figure 7:
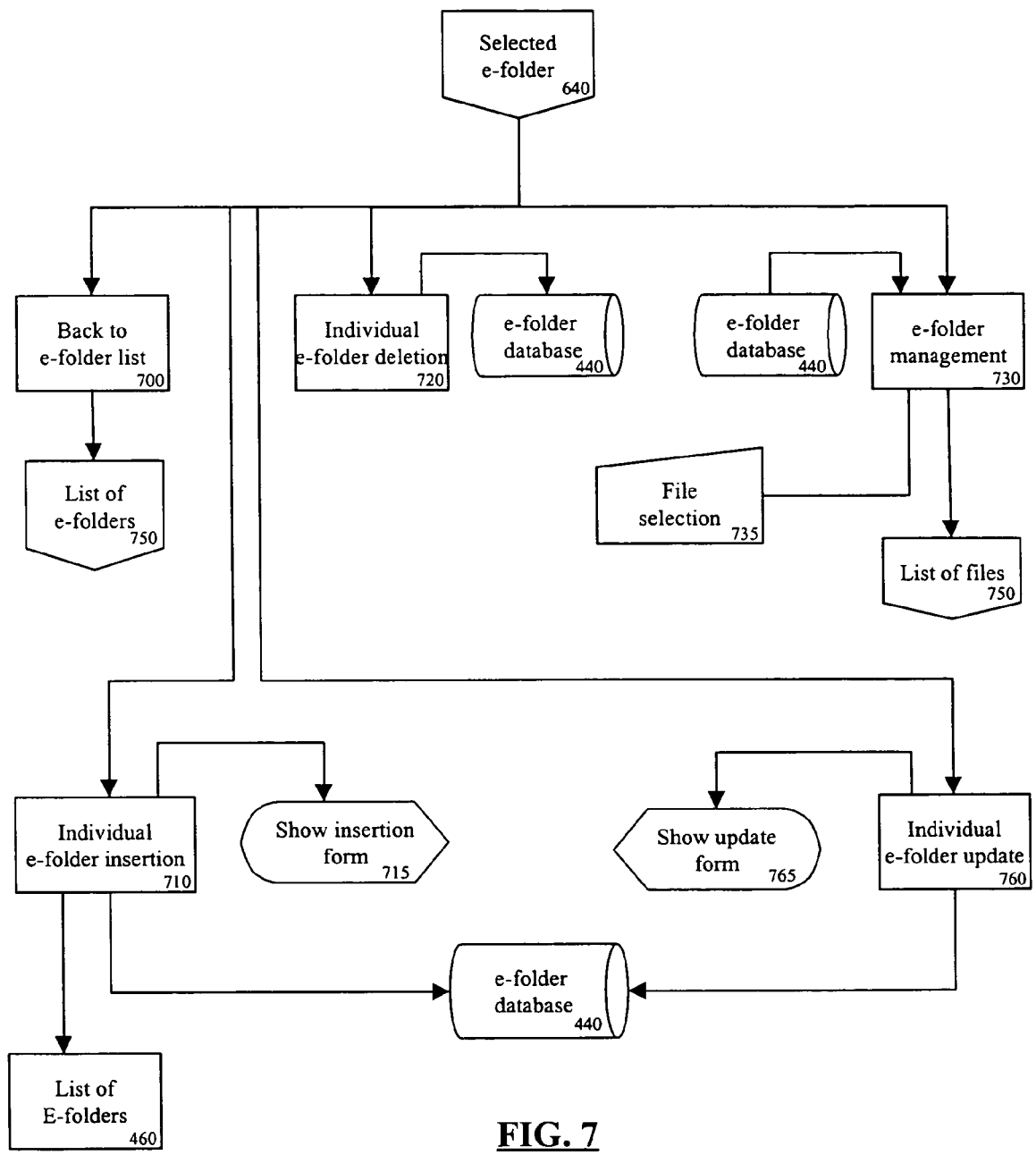
FIG. 7 is a schematic flow diagram depicting the various operations that may be performed on the contents of the electronic folder generated by the process of FIG. 6.

FIG. 7 provides an overview of some of the operations that may be performed on the contents of the cover of the selected electronic folder 640. At step 700, the user may select to return back to the electronic folder list 460.

Once the user is in an electronic folder, the user may perform a plurality of actions, as noted above. For example, the user may add a file, delete a file, modify and save the modified file, send a file to another person, and/or perform various other operations within the scope of the present invention. Thus, at step 710, the user may insert a new electronic folder in the electronic folder management system, which also makes the appropriate changes and/or addition to the electronic folder database 440. To allow insertion, the user is provided an insertion form 715. Changes may also be made to the file database, if necessary. Furthermore, the user is provided the ability to insert information on the cover of the electronic folder. The user may then return back to the original electronic folder list 460 to work on another electronic folder. It should be noted that the user may also return to the start screen of the selected electronic folder 640 to perform other operations on the selected electronic folder 640.

At step 720, the user is allowed to select a file and delete the selected electronic folder, which also makes the appropriate changes and/or deletions in the electronic folder database 440. As noted above, the user may then return back to the original electronic folder list 460 to work on another electronic folder, or to the start screen of the selected electronic folder 640 to perform other operations on the selected electronic folder 640.

At step 730, the user is able to manage the contents of the selected electronic folder 640. For example, the user could provide a file selection 735, so that the system searches the electronic folder database 440 to generate a list of files 750 for performing further actions thereon.

The user may make editorial changes in the electronic folder or updates thereto, as shown in step 760. The system also updates the information on the cover of the electronic folder. To allow changes to the cover, the system may provide the user with a update form 765 where the user could make changes regarding the identifying information of the electronic folder, which will be used to make the appropriate changes in the electronic folder database 440.

Figure 8:
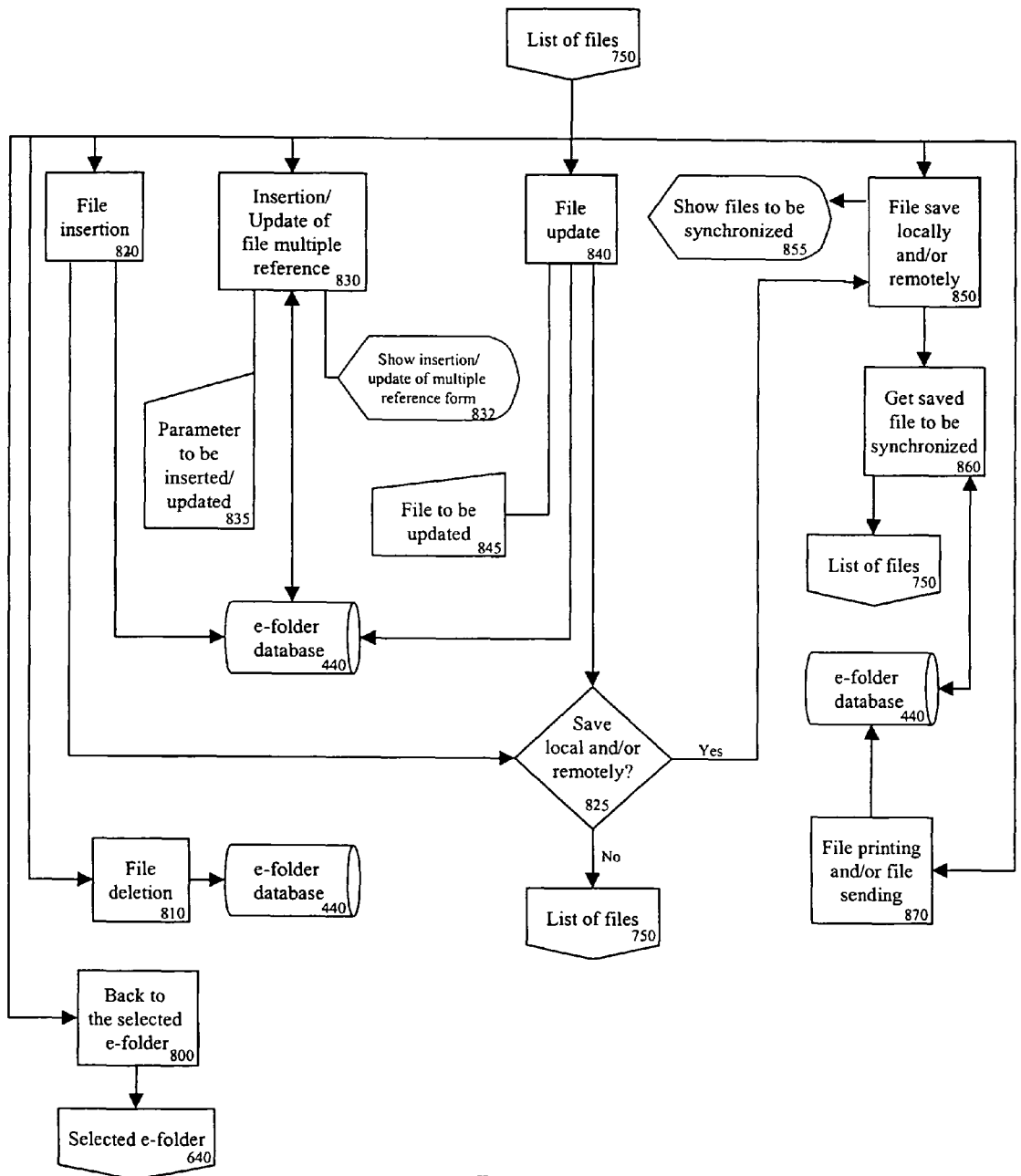
FIG. 8 is a schematic flow diagram depicting the actions that may be performed on the file list the process of FIG. 7.

FIG. 8 provides an overview of some of the actions that may be performed on the file list 750, generated in step 730. Here the user is provided a summarised index of the contents of the selected electronic folder. The user obtains instant access to all the electronic information associated with the selected electronic folder, such as e-mail, faxes, scanned data, documents, files from applications without having to deal with the limited searching capabilities of a file management system. This actions allow the user to immediately locate and retrieve/access the particular set of electronic information linked to the set of data contained in the fields on the cover provided by the user, manage the index of the contents of that particular electronic folder by describing in one line the particular piece of information that may be shown together with the date that particular information was created or last updated in the electronic folder and the type of content, manage contents of the electronic folder by adding, creating, deleting, updating, viewing, printing, sending, and/or transmitting the files. However, should the user decide to return to the previous screen and do no operation on the file list 750, the user may elect to return back to the selected electronic folder 640 in step 800.

At step 810, the user may select a file and delete the selected file, which also makes the appropriate changes and/or deletions in the electronic folder database 440 and/or in the electronic folder management system. The user may then return back to the original electronic folder list 460, the file list 750, or the start screen of the selected electronic folder 640 to provide other operations while the user is in the selected electronic folder 640. After the deletion, the electronic folder management system removes the file from the index of the electronic folder.

At step 820, the user may be provided with a list of files on their local storage that he or she may decide to insert in the present electronic folder management system. Once the file is inserted into the electronic folder management system, the electronic folder database 440 and/or the electronic folder management system is updated accordingly.

At step 830, the system provides an insertion/update form 832 to receive information from the user as to which multiple references are to be updated. The user provides the parameters for the electronic folder that is to be inserted or deleted 835. The system performs a select query to retrieve the electronic folders from the electronic folder database 440, related to the parameters entered. The system sets the screen and shows all the electronic folders related to the entered parameters to the user. If the user chooses to insert an electronic folder reference, the system performs an insert query into the electronic folder database 440. If user chooses to delete, the system performs a delete query in the electronic folder database 440. This feature saves considerable space for storage and controls the version of files in the electronic folder. By means of multiple associations of a single file to several electronic folders, the invention saves storage space and controls the version of the file that might be used by several users.

At step 840, the user may update file. The system checks to see if another employee is already using the file that is being updated. If not, system continues; otherwise the system warns the user and stops. To complete the update, the system makes the appropriate changes and updates the electronic folder database 440 and/or the electronic folder management system. Next, at step 825, the system asks user if he wants to save the content remotely. If the user provides an affirmative answer, the system goes to step 850. On the other hand, if the user does not wish to save the file, the system returns back to the list of files 750.

At step 850, the system asks the user to identify the files that are to be saved locally or remotely. It is also possible for the system to ask the user to identify the local computer file that is to be saved remotely in the electronic folder. The system checks to ensure that the local computer file is valid for becoming part of the electronic folder. At step, 860, the system makes an upload of the local computer file to the server 110, and updates the electronic folder database 440 and/or the electronic folder management system. The system saves the content in its real path.

At step 870, the user may select to print the file or send the file to a third-party user. The process of sending a document to a third-party user is described in more details, with reference to FIG. 10.

Figure 9:
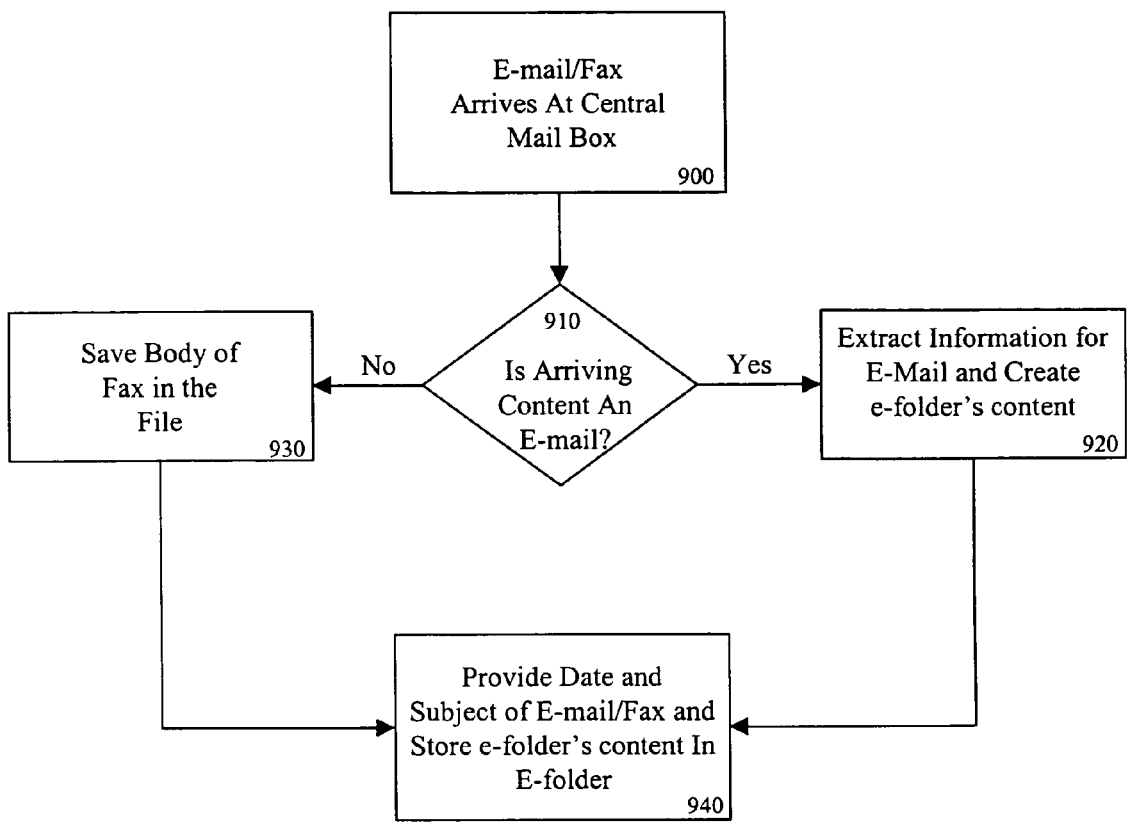
FIG. 9 is a schematic flow diagram showing the process of converting an e-mail or a facsimile into a file and storing it in the electronic folder management system.

FIG. 9 provides an overview of the process involved in converting an e-mail or a facsimile into an electronic folder content 196 and storing it in the electronic folder management system 145. According to the invention, when an e-mail or facsimile is received at the server 110, the electronic folder management system 145 converts it into an electronic folder content 196 and stores it in the appropriate electronic folder 192.

At step 900, an e-mail and/or facsimile arrives at a central mail box. The e-mail comprises a subject header, sender's name and address, a message body and a recipient's name and address. The facsimile that arrives at the central mail box, is in an image format, such as in .tif format, .gif format or the like. Thus, at step 910, the system checks to see whether the arriving content is an e-mail. If the arriving content is an e-mail, then the system extracts all the information included in the e-mail, such as the subject header, sender's name and address, a message body and a recipient's name and address, in step 920. The extracted information is used to create an electronic folder content 196 that can be stored in the electronic folder 192. If the arriving content is not an e-mail, but instead is a facsimile, it is appropriately manipulated and saved as an electronic folder content 196, in step 930.

At step 940, the created electronic folder content is provided with a time and date at which the e-mail or the facsimile arrived. Using the information in the created electronic folder content, the electronic folder content is stored in the appropriate electronic folder 192.

Figure 10:
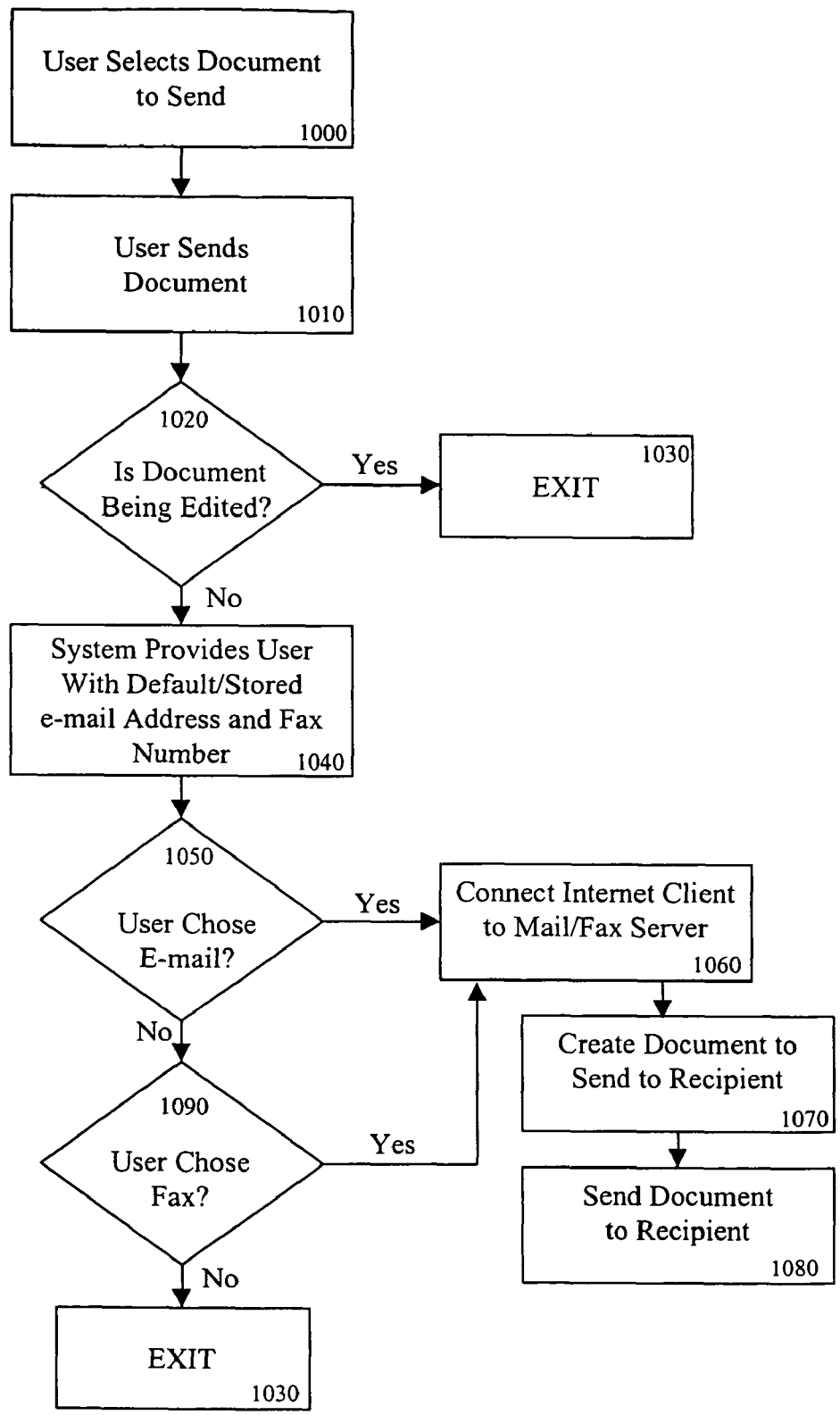
FIG. 10 is a schematic flow diagram FIG. showing the process of transmitting a document to a recipient in the form of an e-mail or a facsimile.

FIG. 10 provides an illustration of the process of sending a document to a recipient in the form of an e-mail or a facsimile, that was earlier mentioned in step 870. At step 1000, the user selects the document 196 from the file list 750 that he or she wishes to send to a third-party recipient. At step 1010, the user initiates the sending of the file by clicking the send button on a user interface provided to the user.

At step 1020, the system checks to see if the document is being edited. If the document is being edited, then the system terminates the process for sending the file, as shown in step 1030. On the other hand, if the document 196 is not being edited, then the system provides the user with a choice of the default e-mail addresses and facsimile phone numbers associated with the underlying electronic folder, in step 1040. The user may choose one of the default e-mail addresses to send the document by e-mail, or choose the default facsimile phone numbers to send the document by facsimile. Alternately, the user may also provide another e-mail address or facsimile phone number to the system.

At step 1050, the system checks to determine if the user wishes to send the document by e-mail. If the user wishes to send the document by e-mail then the system connects an Internet client to the mail/fax server, in step 1060. At step 1070, the system creates the document with the appropriate parameters, such as recipient, subjects and the like. Generally, the recipient is the e-mail address or the facsimile phone number provided, and the subject is the topic of the document being sent. At step 1080, the document is sent to the recipient by the method selected in step 1040.

At step 1090, the system checks to see if the user selected to send the document as a facsimile. If the user selects to send the document as a facsimile, then the control is forwarded to step 1060, where the system connects an Internet client to the mail/fax server. As noted above, in step 1070, the system creates the document with the appropriate parameters, such as recipient, subjects and the like, and, at step 1080, the document is sent to the recipient.

If the user does not select to send the document as a facsimile or as an e-mail, then the system terminates the process for sending the file, in step 1030.

Figure 11:
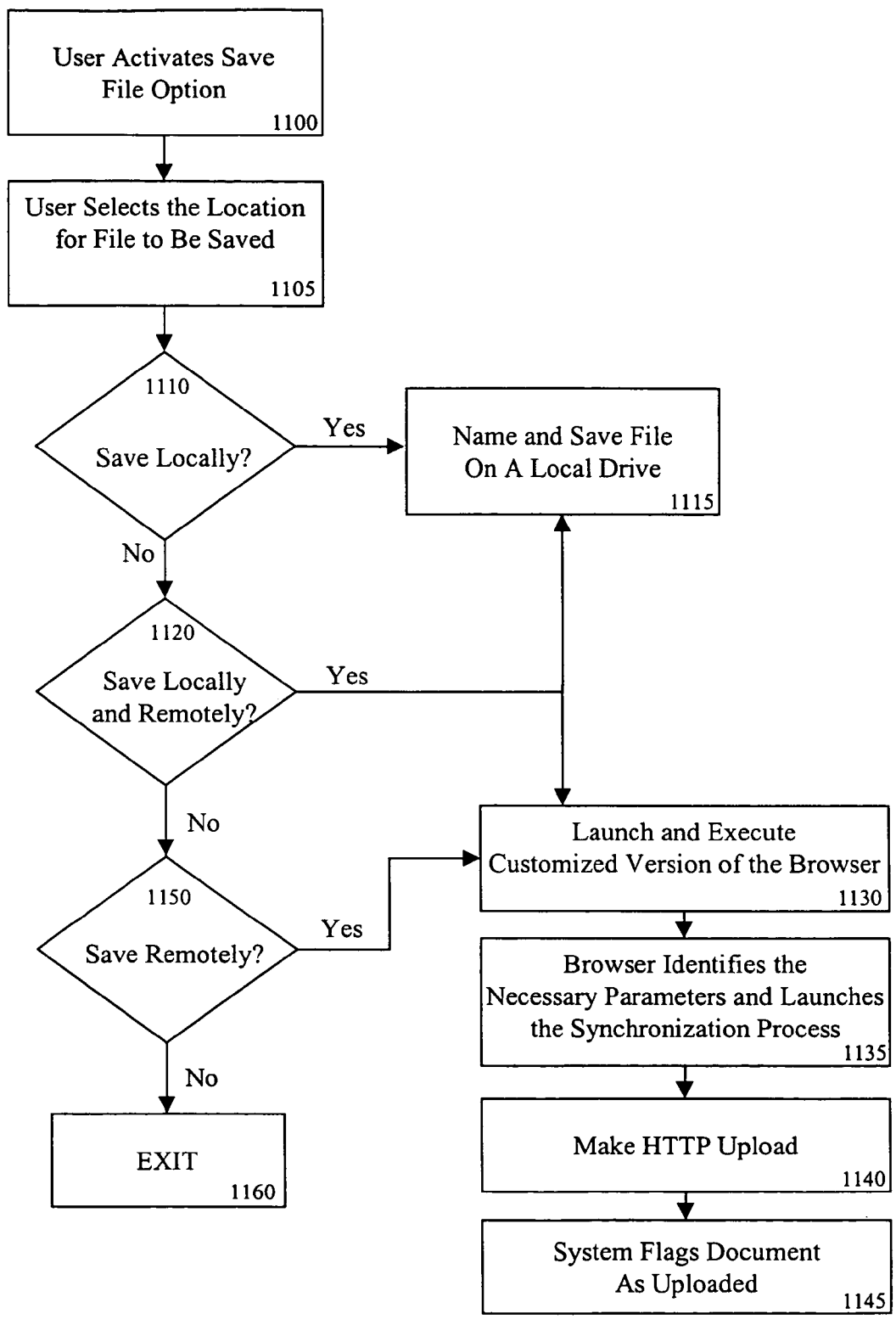
FIG. 11 is a schematic flow diagram showing the process of saving a document locally or remotely.

FIG. 11 is an overview of the process of saving a document locally or remotely, as mentioned in step 850. At step 1100, the user activates the option to save a document by clicking on a save button on the user interface. At 1105, the user selects the location at which the document is to be stored. The user may elect to save the document locally on their local disks or remotely within the electronic folder management system 145, or both locally as well as remotely. At step 1110, the system checks to determine whether the user decided to store the document locally. If the user decided to store the document locally, the system allows the user to provide a name for the file and then the system stores the file on the local drive, in step 1115.

If the user elected not to store the document locally, then the system checks to determine if the user decided to store the document locally as well as remotely, in step 1120. If the user selected to save the document locally as well as remotely, then the system saves the file locally as discussed above, as well as launches and executes a customized version of the browser that is configured to import files into the electronic folder management system 145, in step 1130. At step 1135, the customized browser identifies the necessary parameters for the document and launches the synchronization process, which was described above. The parameters are used to define and store information regarding the document being saved remotely, as well as to determine the electronic folder in which the document is to be stored. In step 1140, the system makes a Hypertext Transfer Protocol (HTTP) upload of the document 196. Finally, in step 1145, the system flags the document 196 as uploaded and places it in the appropriate electronic folder 192.

If the user does not wish to save the document locally and remotely, but wishes to save the document in the electronic folder only, then the system at step 1150, forwards the control to step 1130. As noted above, in step 1130, the system launches and executes a customized version of the browser. At step 1135, the customized browser identifies the necessary parameters for the document and launches the synchronization process. In step 1140, the system makes a Hypertext Transfer Protocol (HTTP) upload of the document. Finally, in step 1145, the system flags the document as uploaded and places it in the appropriate electronic folder.

However, if the user does not wish to save the document at all, then the system terminates the process for saving the file, in step 1060.

Figure 12B:
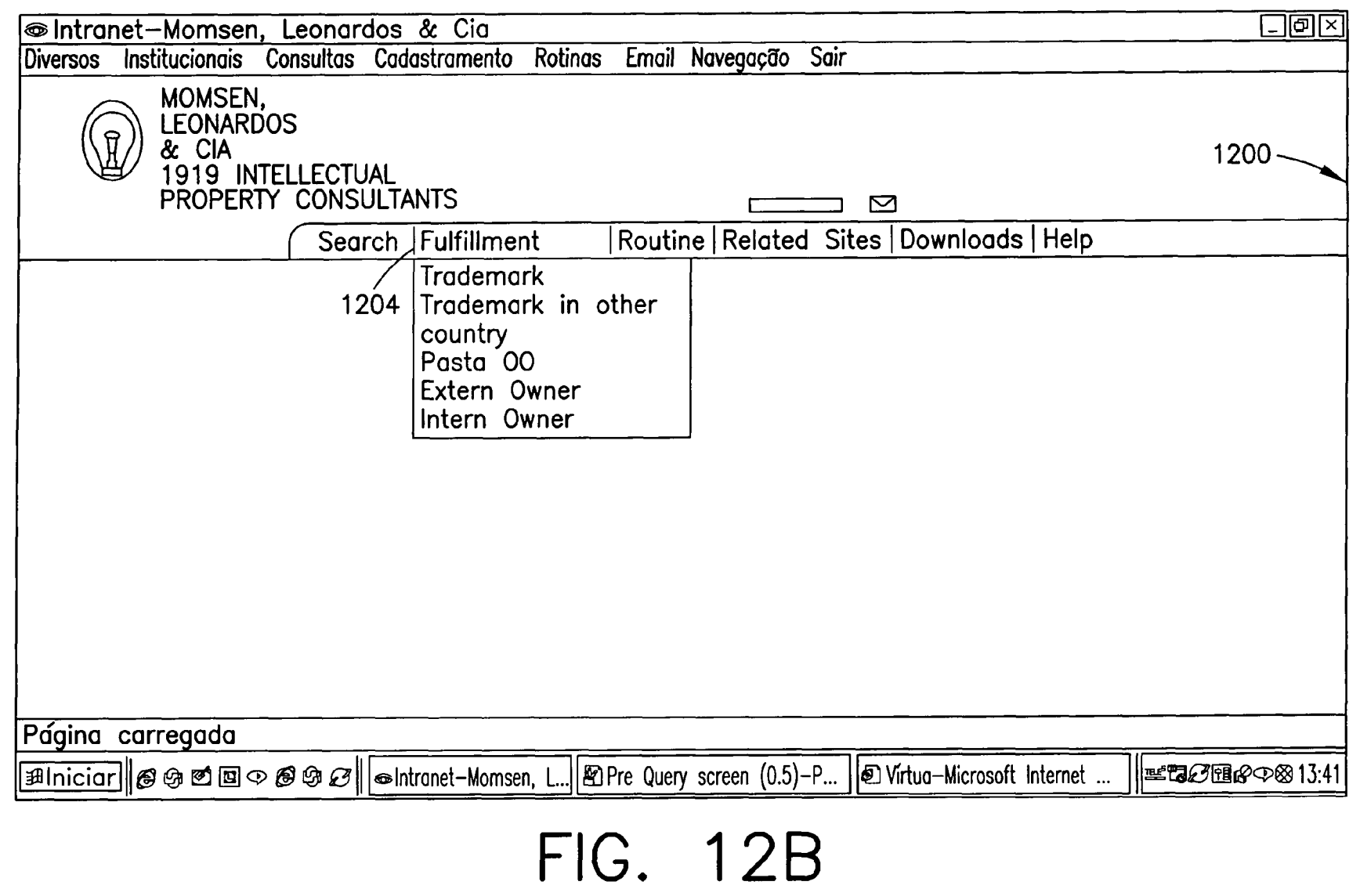
Figure 12C:
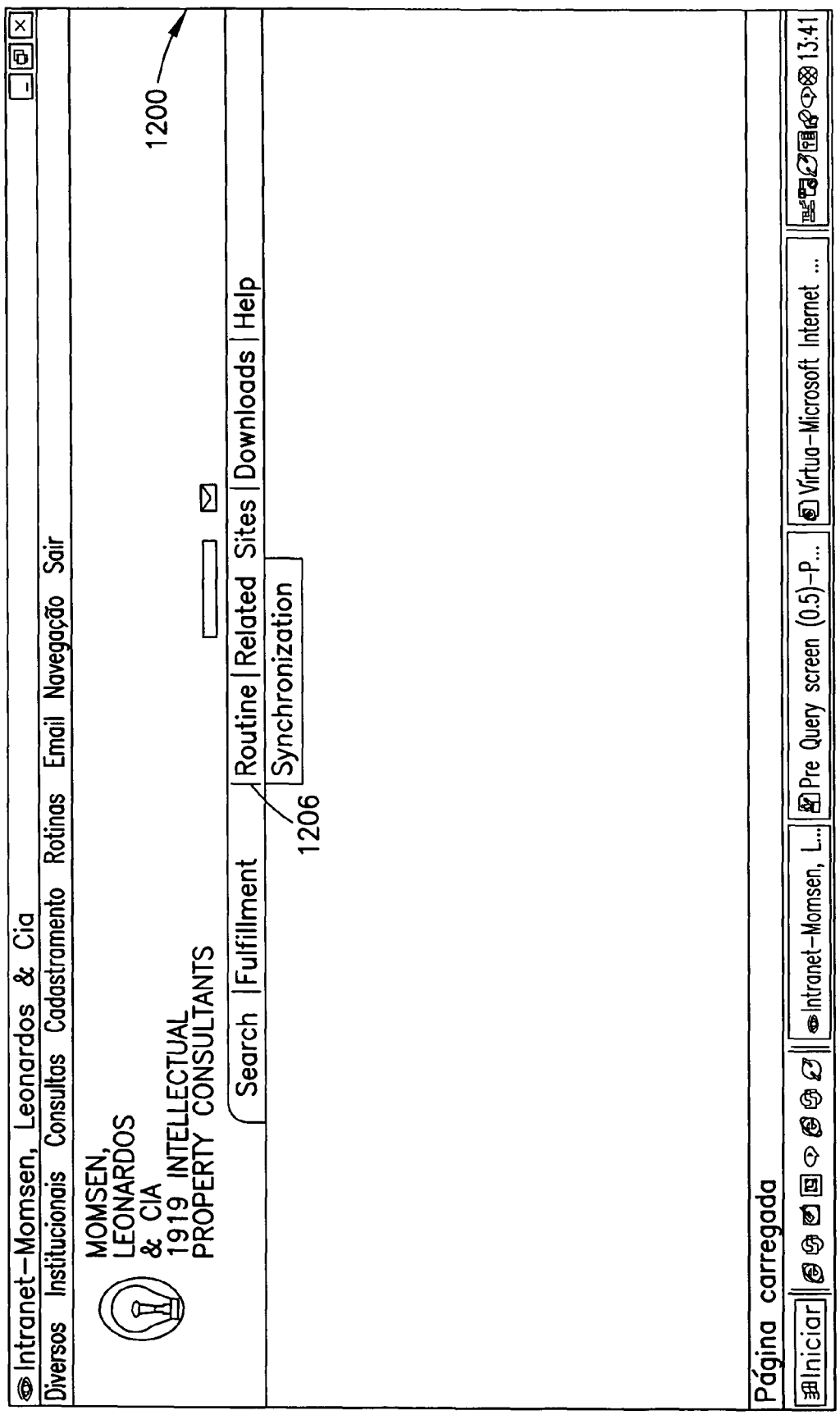

FIGS. 12A-12L provide screen shots of one embodiment utilizing the present electronic folder management system. The discussion relating to FIGS. 12A-12P provides an illustration of the manner in which the present electronic folder management system 145 may be utilized by a law firm that is involved in the practice of intellectual property (IP) law.

It should be noted that while the present example discusses the use of the present electronic folder management system 145 in an IP law firm setting, the scope of the present invention is not to be limited thereby. The present invention can be used to provide electronic folder management system 145 for use in any office setting, at homes where parents may maintain records of their financial records as well as school records for their children, and the like.

FIG. 12A shows the start screen 1200 of an electronic folder management system that is configured to store files relating to patents, trademarks, copyrights, and litigation in an IP law firm. Using the search facility 1202, the user can search for files and/or electronic folders on a variety of different subjects within the electronic folder management system. For example, the user may work on trademark files by clicking on "trademark" with a mouse or a similar/substitute device, which will take the user to the appropriate screen to search for and work with files relating to trademarks. Similarly, the user can decide to work on patent files, some particular client, and the like.

FIG. 12B provides another view of the start screen 1200, wherein the user may select an option from the "fulfillment" choices 1204 to insert a new electronic folder in the electronic folder management system, which also makes the appropriate changes and/or addition to the electronic folder database.

FIG. 12C is yet another view of the start screen 1200, wherein the user is able to upload a remotely saved file. Once the user selects "synchronization" 1206, the system receives the remote file, saves the file in a temporary location, and then makes the necessary entries into the file database. After making the necessary entries, the file is available in the electronic folder management system.

Figure 12D:
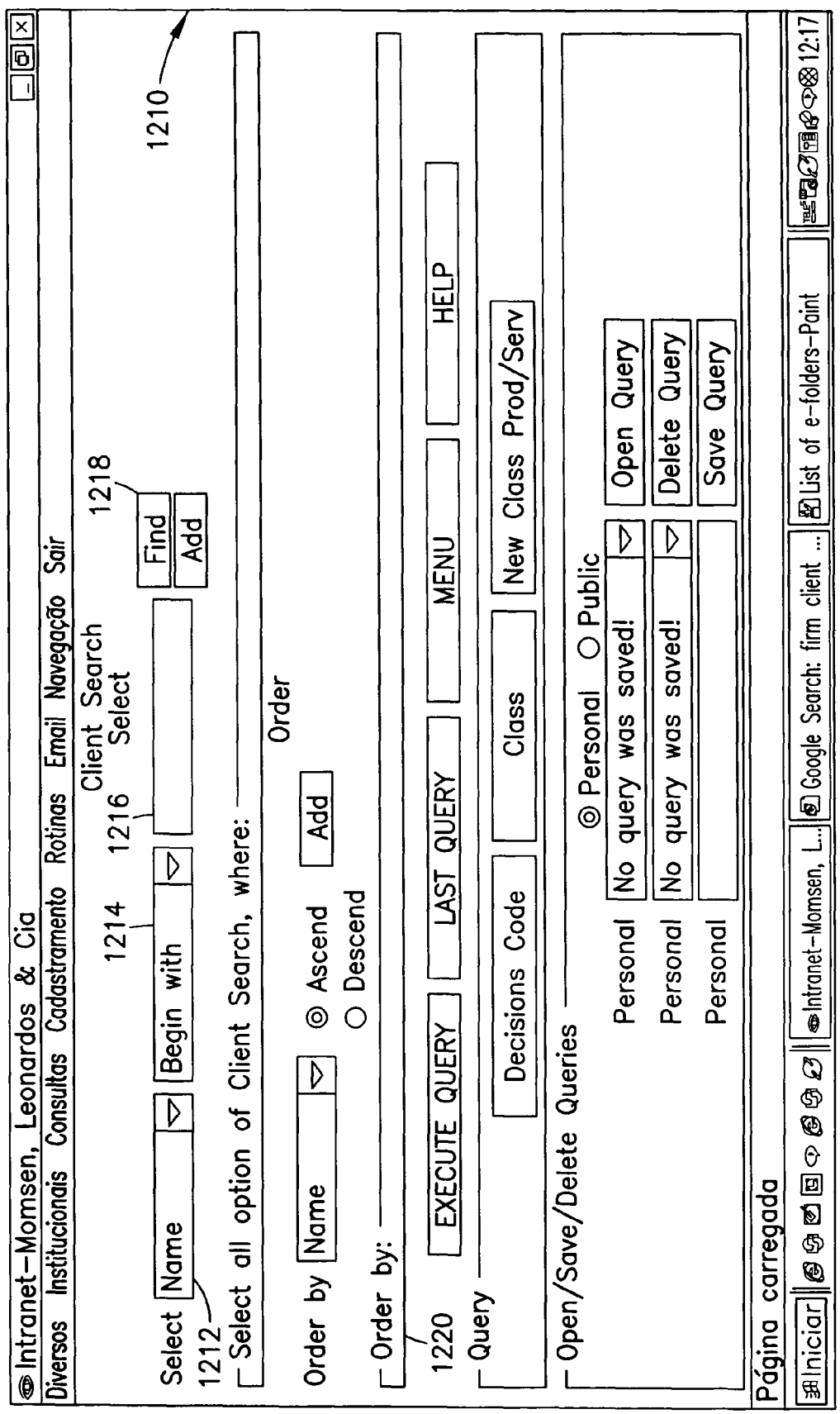

FIG. 12D provides a screen shot of a client search screen 1210, which is provided to the user when the user uses the search facility 1202 to search based on clients on the start screen 1200. For example, the user may search for clients by selecting the name option 1212, and then selecting the "begin with" choice 1214 and providing the named of the desired client in the name slot 1216. Once the user presses the find button 1218, the system will search the electronic folder database and the file database to retrieve the appropriate electronic folders and/or the electronic folder's contents. The user may elect to receive the electronic folders that satisfy the search parameters, by listing the electronic folders and/or the electronic folder's contents in ascending or descending order of clients' names.

FIG. 12E provides a screen shot of a search screen that allows the user to refine the search. For example, the user may provide additional details 1225 about the client's name, such as indicating that the client's name contains "finnegan" as part of it. This will limit the number of electronic folders that are listed by the system as a result of the query.

FIG. 12F provides a screen shot of a list of client's whose electronic folders are stored in the electronic folder management system. The list 1230 is generated in response to the search parameters entered by the user. The user may use the generated list to prepare a report, which is generated when the user clicks on the report button 1232. According to the invention, the user may select or deselect the client's who are to form a part of the report being generated. The user can also click on a client name listed on the list 1230 to open the underlying electronic folder and to work therein; once the electronic folder is open, the user may perform any function that is typically performed on the contents of a paper folder.

Figure 12G:
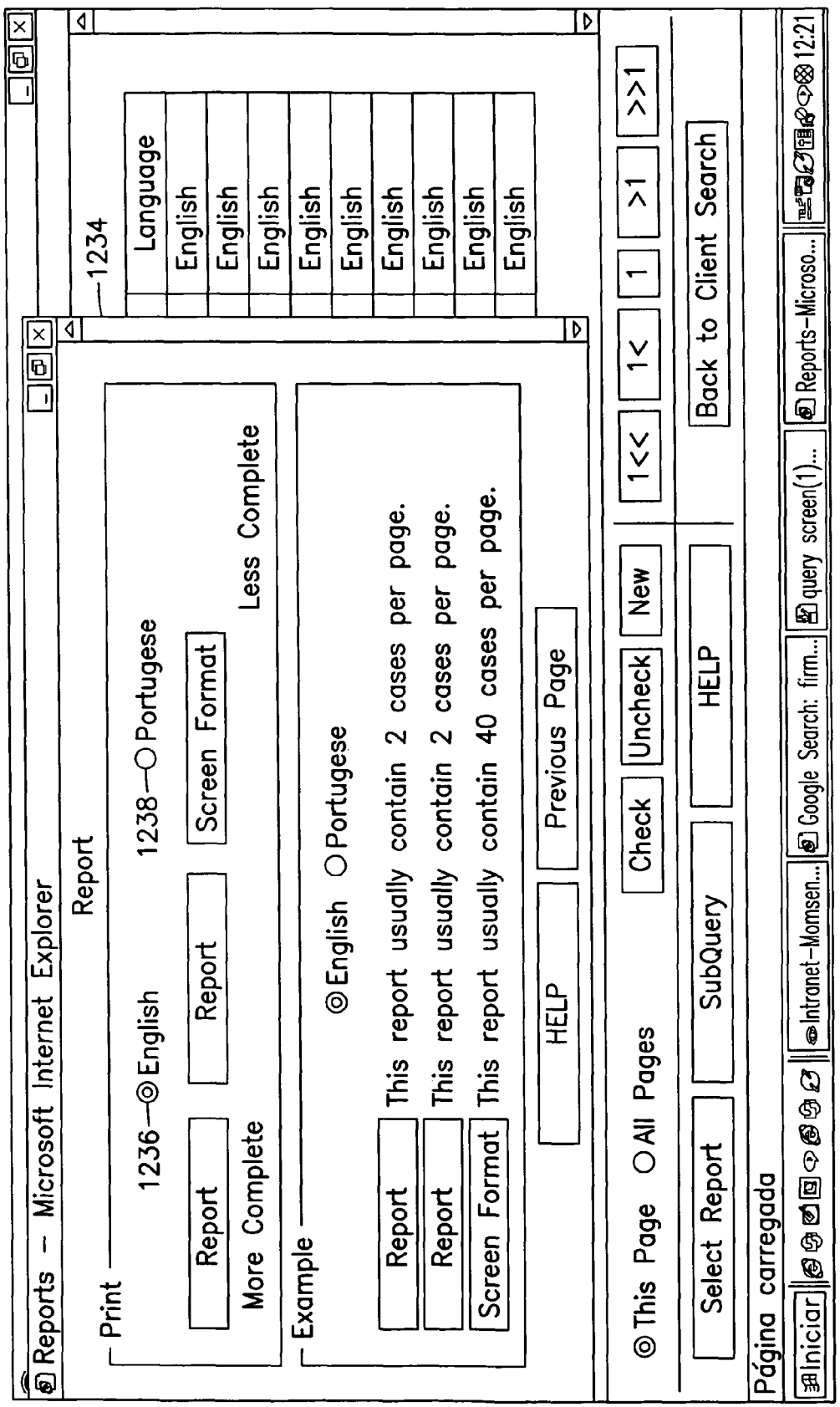

FIG. 12G shows a report generation screen 1234, which illustrates the various formats that can be used to generate reports by the user. For example, the user may select to print the report in English by selecting the English option 1236 or in Portuguese by selecting the Portuguese option 1238. Furthermore, the user may select from various report formats, such as a detailed report which includes only one case, or a listing which includes fifteen cases per page.

Figure 12H-1:
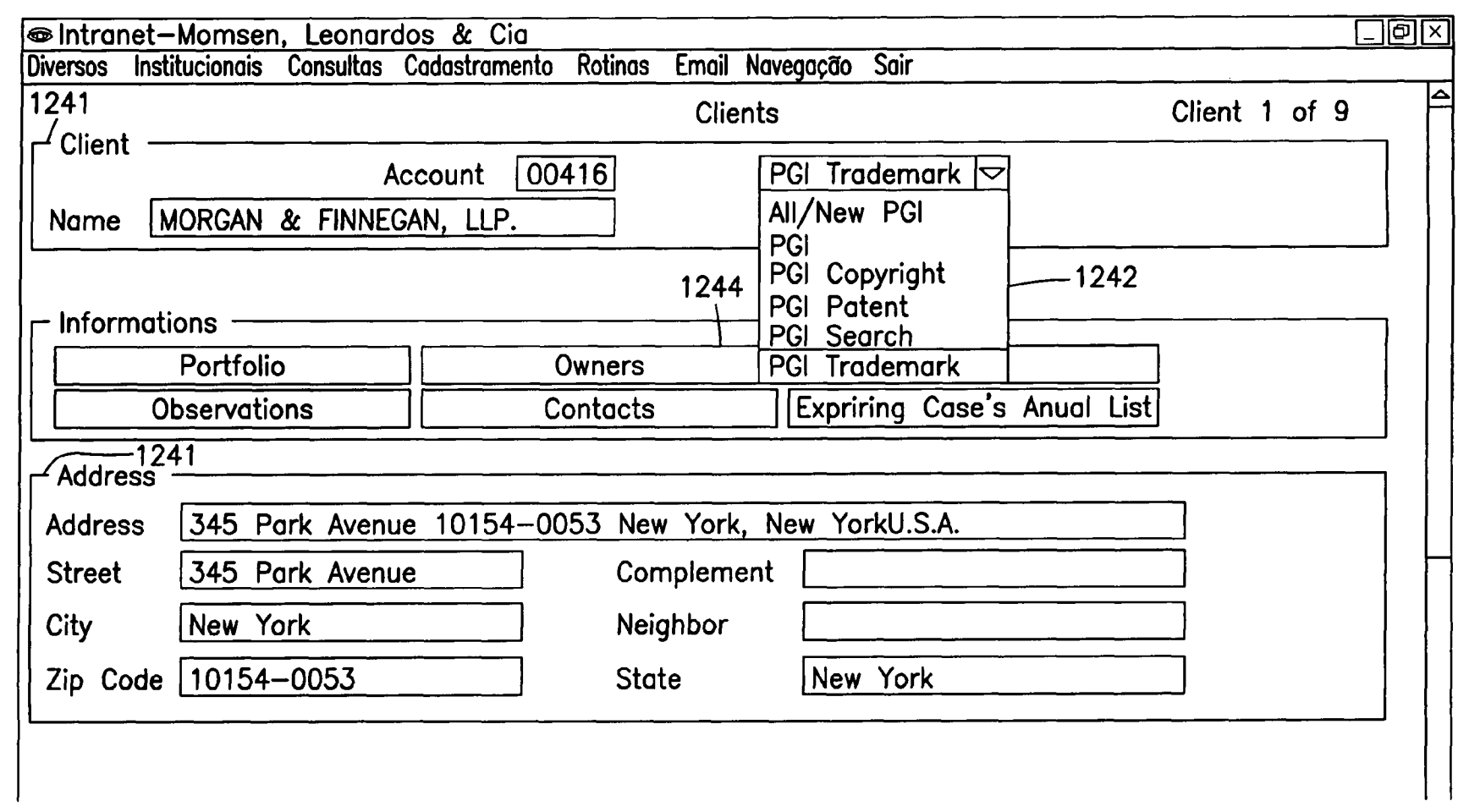
Figure 12H-2:
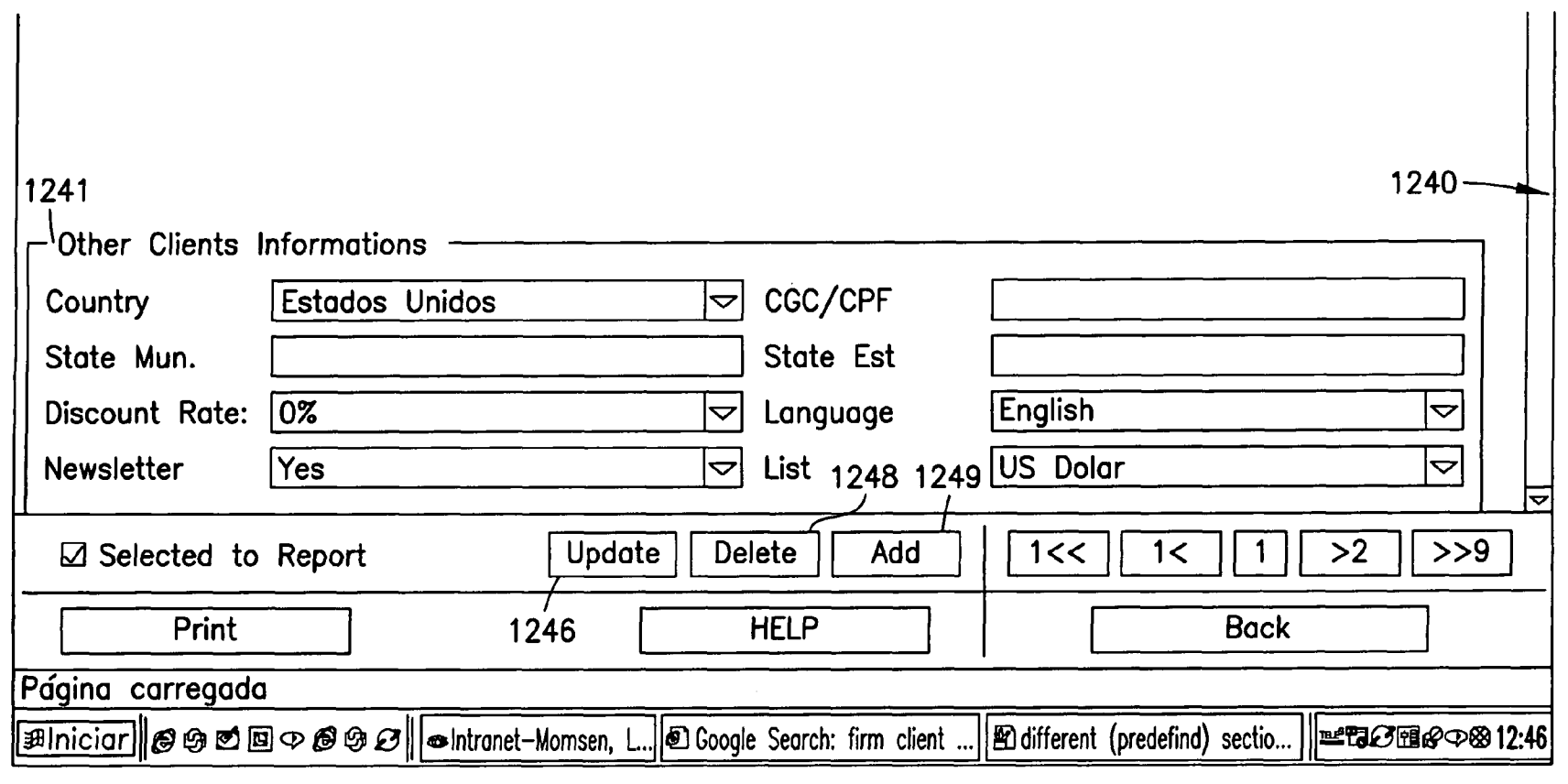

FIG. 12H provides a screen shot of a cover page 1240 for an electronic folder that belongs to a particular client. As shown in the figure, the cover page 1240 contains user information 1241, which includes the client's name, account number, client's address, and other miscellaneous information. The cover 1240 is also provided with a type selection pull-down window 1242, which allows the users to designate the type of the electronic folder. An owners button 1244 is provided, which may be clicked by the user to list the users who are to have owners' rights for the electronic folder. The user may also be provided with the options of updating the electronic folder, deleting the electronic folder or adding a new electronic folder by clicking on update button 1246, delete button 1248, or add button 1249 respectively.

Figures 1, 12I:
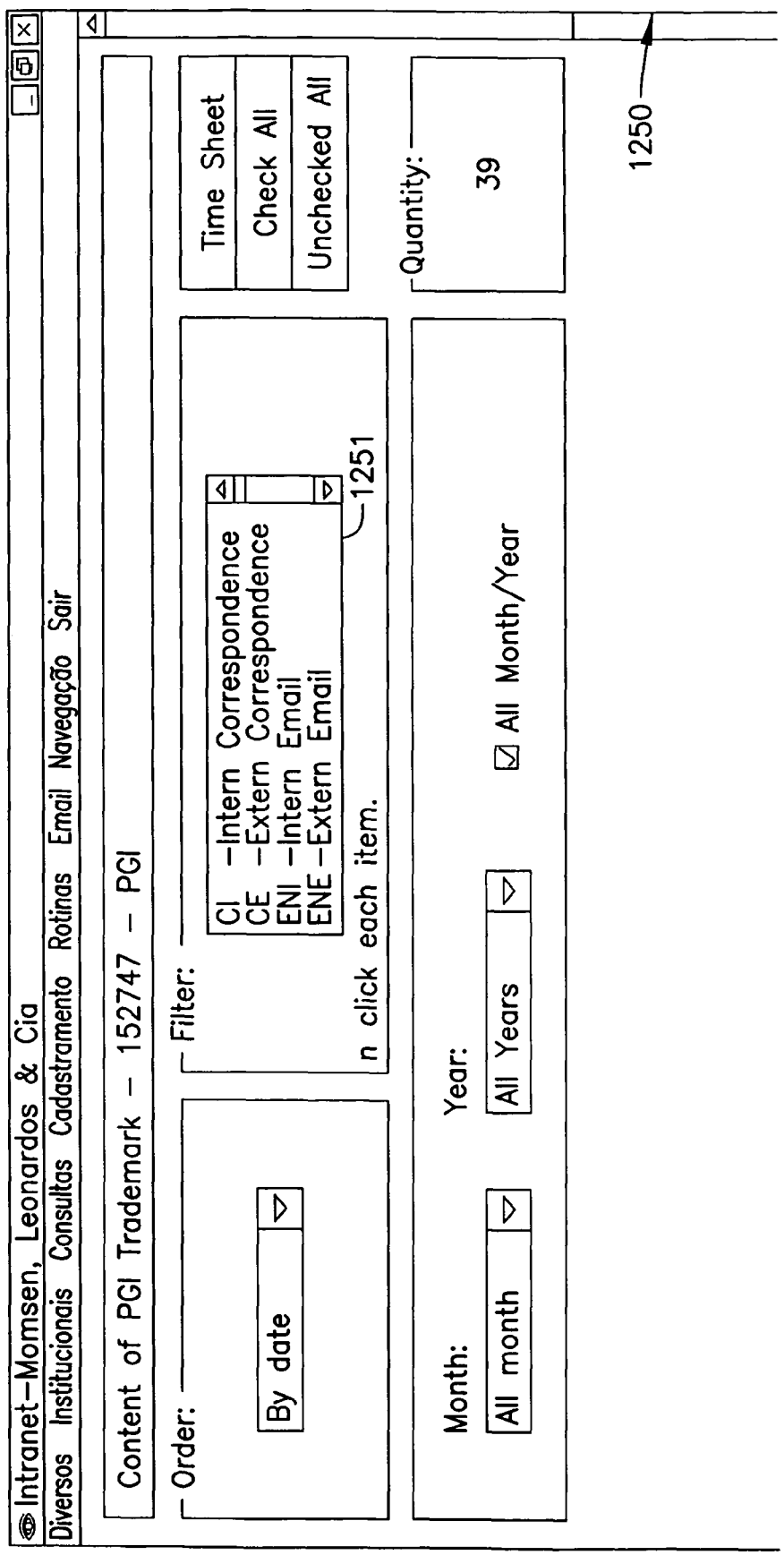
Figures 2, 12I:
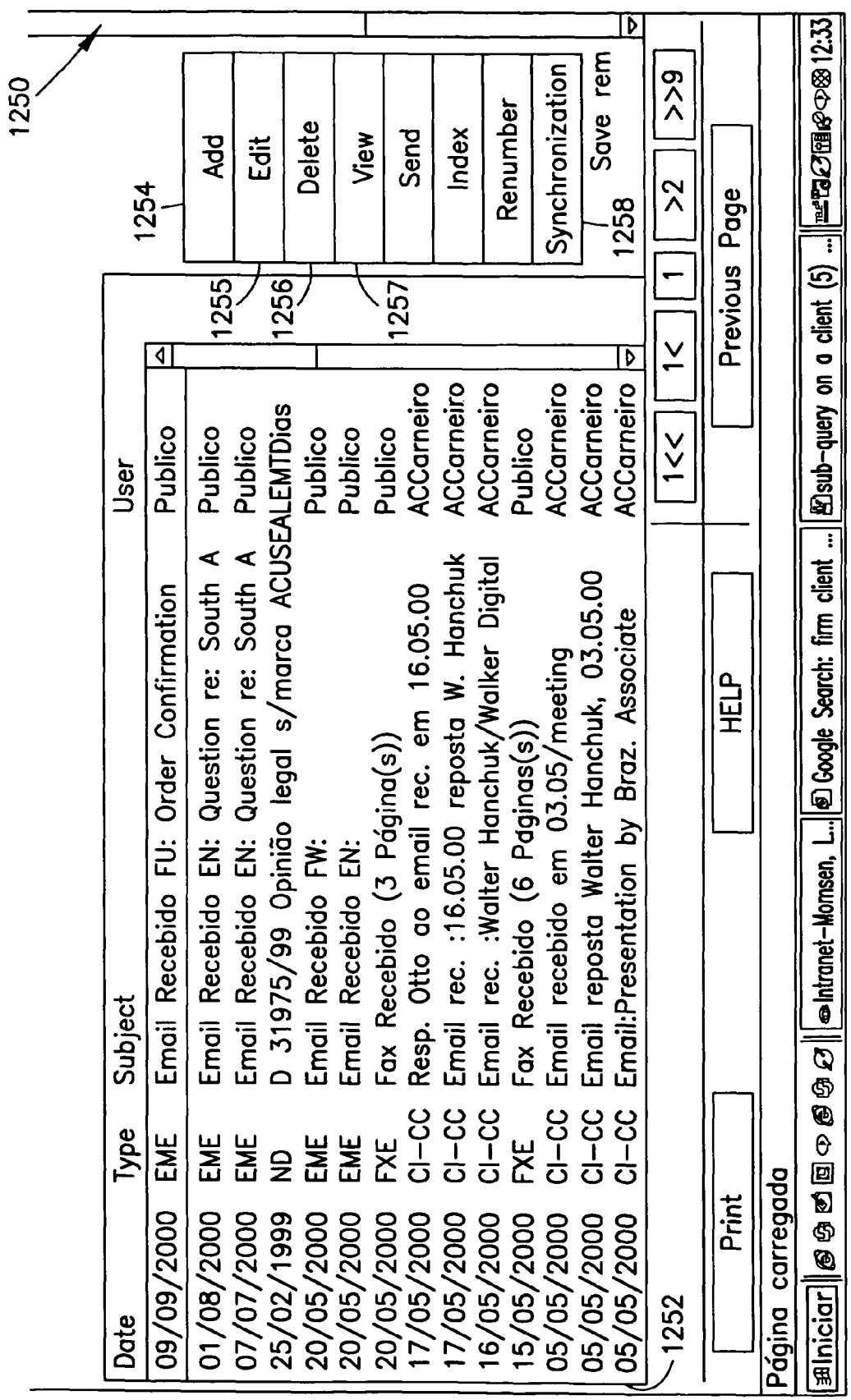

FIG. 12I is a screen shot of the table of contents 1250 for the electronic folder. The user may choose the content type 1251 that he or she wants listed, such as internal correspondence, external correspondence, internal e-mail, external e-mail or the like. The appropriate files are listed in a file list 1252. The user may elect to add a new file edit an existing file, delete an existing file, view an existing file by clicking on the add button 1254, edit button 1255, delete button 1256 or view button 1257 respectively. The user may also remotely save a file into the electronic folder management system by clicking on the synchronization button 1258, as described above.

FIG. 12J provides a screen shot of a section page 1260, which lists the various sections in the electronic folder. The user may also add a new section 1262 by clicking on the add button 1263. The user may define the section type by selecting from the one or more section types mentioned in the pull-down type selection box 1264, or define a new type.

Figure 12K:
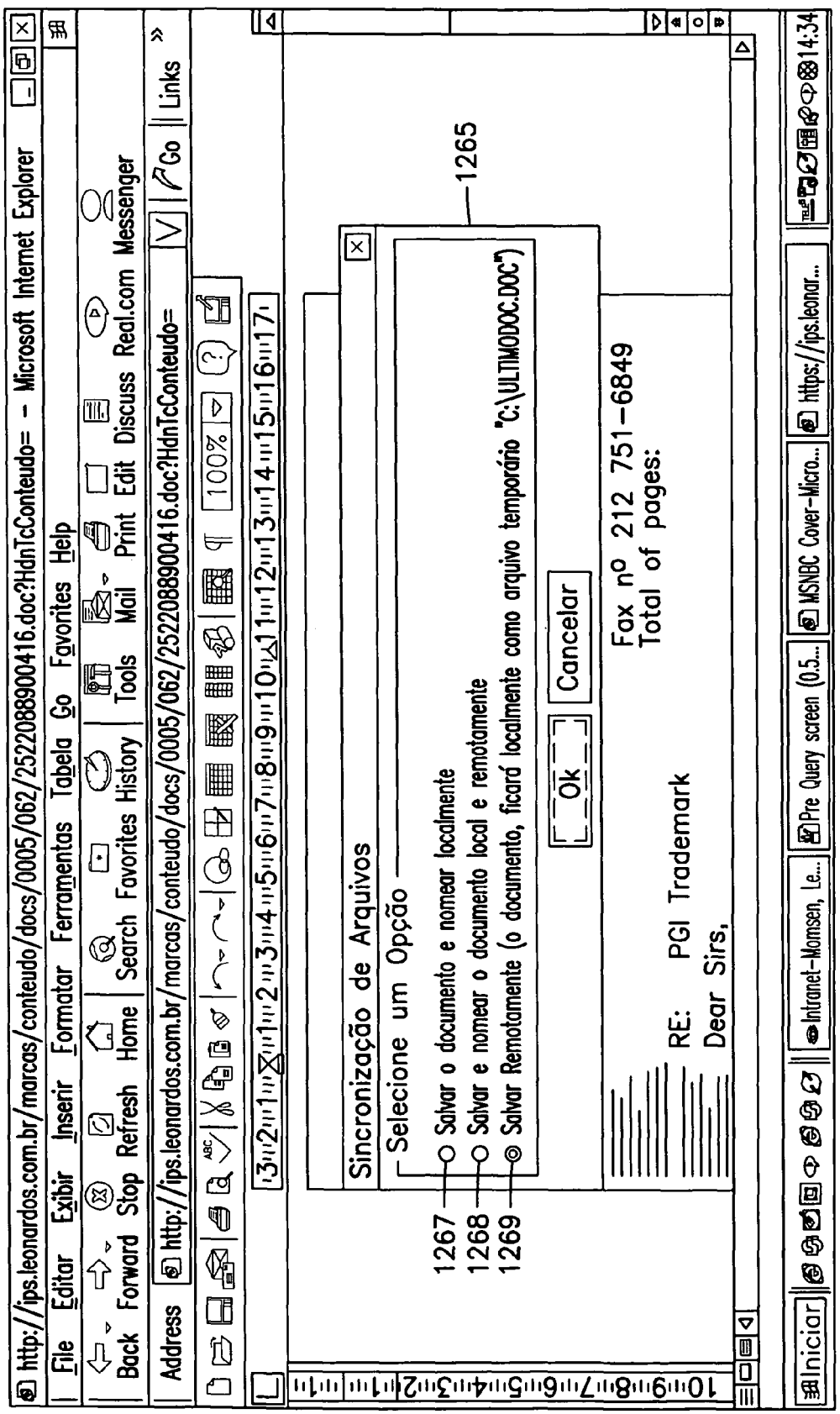

FIG. 12K provides a screen shot illustrating the file transfer mechanism 1265. The user may select to save a file in the electronic folder being used in the electronic folder management system 145, by selecting the save remotely option 1269. It is also possible for the user to save the file in the local device, such as their personal hard drive, by selecting the save locally option 1267. According to the invention, it is also possible for the user to both save locally as well as save remote by selecting the save local and remote option 1268.

Figure 12L:
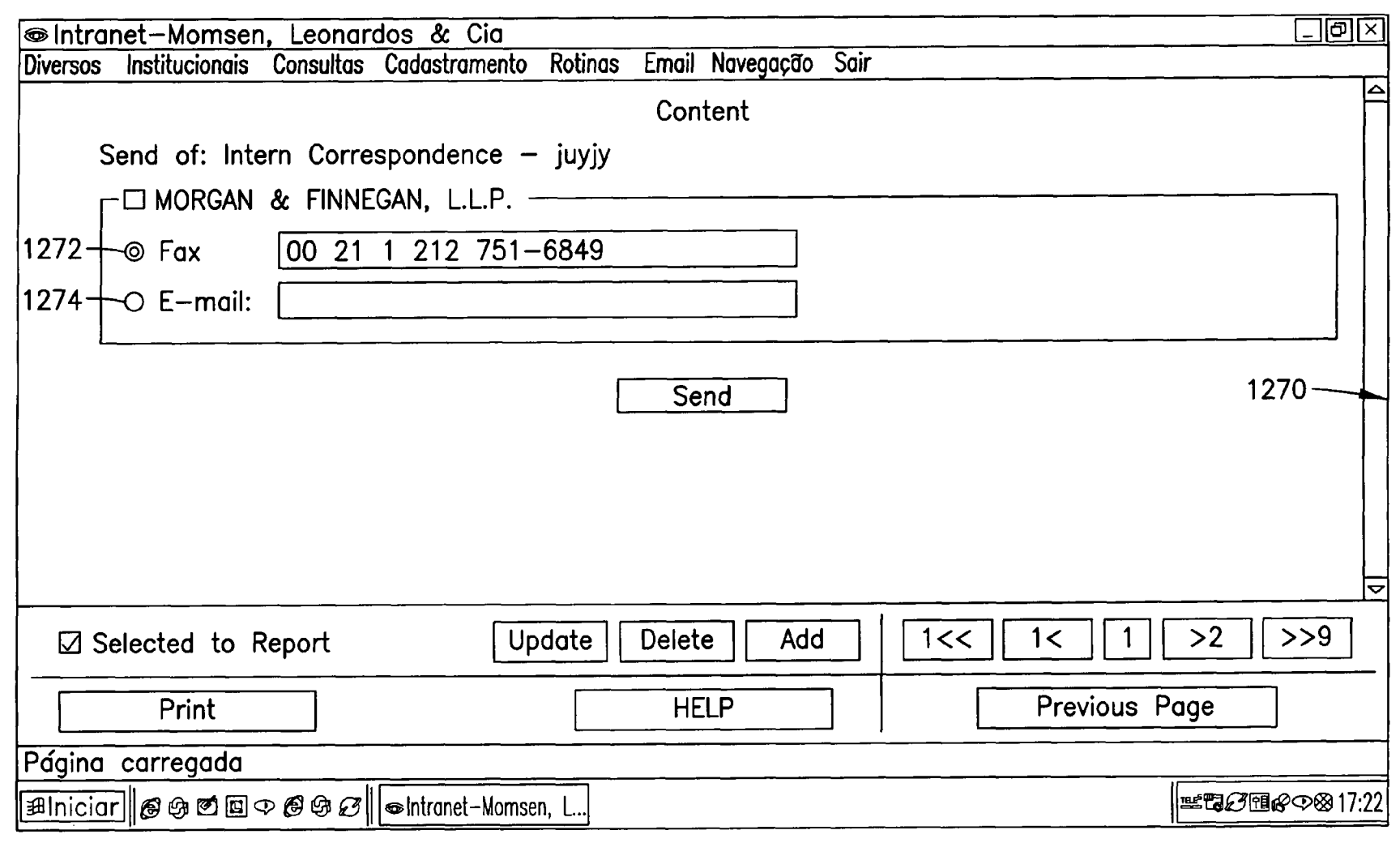

FIG. 12L provides a screen shot for the send file facility 1270. Using this facility, it is possible for the user to send a file to a third party by facsimile or by e-mail by selecting the facsimile option 1272 or the e-mail option 1274.

In summary, the above-provided detailed description discloses a method and system for managing electronic information for one or more users. The method includes creating a electronic folder management system to maintain a list of electronic folders, creating an electronic folder in the electronic folder management system, creating a computer file and storing the computer file in the electronic folder management system, and associating the electronic folder with the stored computer file. The electronic folders and the computer files are stored in the electronic folder management system. According to one embodiment, the computer files associated with the electronic folder may all be linked together so that it is possible to access a first file within the electronic folder from a second file in the electronic folder. The files are computer-readable.

According to the invention, the electronic folder is provided a cover page that is capable of receiving information from a user to identify the electronic folder. Information is received on the cover page of the electronic folder after the creation of the electronic folder. The computer files and electronic folder are managed by the system of the present invention, which enables the searching and retrieving of desired files and/or electronic folders following the managing of the computer files. The computer files may be data files, document files, e-mails, voice mails and the like. In response to a user's search query, the system is capable of providing a list of electronic folders and/or files that satisfy the search query. The electronic folders and/or files can be modified, deleted, or the user may add new electronic folders and/or files to the electronic folder management system. The user may also print the contents of the electronic folder management system, and/or perform a variety of other operations on the contents, individually or as a group, within the scope of the present invention.

The electronic folder management system may be accessed over a network, or accessed locally. Thus, a user may use the present system to manage electronic information stored on a server by transmitting a login request to the server, wherein the server must validate (i.e., authenticate) the login request from the user. The user can create an electronic folder and a computer-readable file that is stored within the electronic folder management system. As noted above, the computer-readable files are associated to the electronic folders so that the user can retrieve the computer-readable file by accessing the electronic folder.

To enable a user to use the electronic folder management system over the Internet, the server authenticates a user upon login, determines if said user has an existing electronic folder resident in the server, and may list the electronic folder(s) owned by the user. The user is provided the ability to use a search facility for searching files and/or electronic folders, and the server receives a search request from the user. As a result, the server locates the appropriate files and/or electronic folders based on the search request entered by the user, and generates a list of files and/or electronic folders satisfying the search criteria. The user sends a selection for one of the files and/or electronic folders from the generated list to perform a desired action thereon, and the server performs the desired action chosen by the user on the selected file and/or the selected electronic folder. Each electronic folder has a selected file associated therewith.

In light of the aforementioned detailed description, it should be noticed that the present invention reduces the redundancy of data stored both at a database management system (DBMS) for mission critical applications and at the document management systems (DMS), which is repeated in the labels used by the document management systems for storing and retrieving files. The present invention reduces the number of applications running in any computerized device, such as personal computer (PC), to access both the DBMS and the DMS information. The present invention reduces the number of actions or steps required to create files by using the information available on the management system of the present invention. The present invention reduces the number of actions or steps required by the DMS to create files and save them in a manner that facilitates later retrievable of these files.

In addition, the present invention enables the searching of computer files by means of all data and capabilities available on mission critical DBMS applications, which are associated to these files in the electronic folder. The present invention also reduces the burden of file version control because it allows multiple users to simultaneously access and create documents. The present invention further reduces the space required to store files, since there is no duplication to distribute it to different user.

It is understood that the above description is only representative of illustrative examples of embodiments and implementations. For the reader's convenience, the above description has focused on a representative sample of all possible embodiments, a sample that teaches the principles of the invention. Other embodiments may result from a different combination of portions of different embodiments. The description has not attempted to exhaustively enumerate all possible variations.

Those skilled in the art will recognize that the method and system of the present invention has many applications, and that the present invention is not limited to the representative examples disclosed herein. Alternate embodiments may not have been presented for a specific portion of the invention. Some alternate embodiments may result from a different combination of described portions, or other undescribed alternate embodiments may be available for a portion. This is not to be considered a disclaimer of those alternate embodiments. It is recognized that many of those undescribed embodiments are within the literal scope of the following claims, and others are equivalent.

It is to be understood that the tasks described in the following claims can be sequenced in many different orders to achieve the desired result. Thus, the scope of the present invention covers conventionally known variations and modifications to the system components and the method steps described herein, as would be known by those skilled in the art.

What is claimed is:

1. A processor-implemented method for managing access to data stored in a document management system, comprising:
examining an electronic object, wherein the electronic object is configured in accordance with one of a plurality of allowed base electronic object formats;
extracting information from the electronic object based on examining the electronic object;
determining at least one indexing identifier characteristic of the electronic object using the extracted information;
determining automatically via a processor at least one relationship between the electronic object and an organizational index for the document management system, said at least one relationship determined from a dynamic system correlation including:
comparing the at least one indexing identifier characteristic of the electronic object with the organizational index; and
associating the at least one indexing identifier characteristic of the electronic object with a package identifier of a transferable package;
updating the organizational index to incorporate the at least one indexing identifier characteristic of the electronic object;
storing the electronic object in association with the transferable package having the package identifier and corresponding to the organizational index in the document management system; and
storing said at least one relationship in the document management system.

2. The method of claim 1, further comprising:
receiving the electronic object.

3. The method of claim 2, wherein the receiving of the electronic object is from an application program.

4. The method of claim 3, wherein the application program includes a word processing program, a spreadsheet program, a presentation authoring program, a multimedia authoring program, an electronic mail program, a data transfer program, and a facsimile machine.

5. The method of claim 2, wherein the receiving of the electronic object is from a user of the document management system.

6. The method of claim 1, wherein the electronic object includes content data and data that describes the electronic object.

7. The method of claim 6, wherein the examining is of the content data.

8. The method of claim 7, wherein the determining of said at least one indexing identifier characteristic is based on the content data.

9. The method of claim 6, wherein the examining is of the data that describes the electronic object.

10. The method of claim 9, wherein the determining of said at least one indexing identifier characteristic is based on the data that describes the electronic object.

11. The method of claim 1, wherein said at least one indexing identifier characteristic identifies the electronic object.

12. The method of claim 1, wherein said at least one indexing identifier characteristic uniquely identifies the electronic object.

13. The method of claim 1, wherein said at least one indexing identifier characteristic includes a classification, and a name.

14. The method of claim 1, wherein a first electronic object having a first relationship to a first entry of the organizational index links to a second electronic object having a second relationship to a second entry of the organizational index when the first entry and the second entry are the same.

15. The method of claim 14, wherein access to the first electronic object also provides access to the second electronic object.

16. The method of claim 1, wherein the organizational index includes at least one entry.

17. The method of claim 16, wherein the determining of said at least one relationship further comprises:
associating the electronic object with at least one of said at least one entry.

18. The method of claim 17, wherein access to one of said at least one entry allows access to each associated electronic object.

19. The method of claim 1, further comprising:
providing searchable/readable/writeable access to the electronic object.

20. The method of claim 1, further comprising:
creating a package for facilitating access to a plurality of electronic objects with different object formats, wherein the package is transferable by transferring the package and each of the corresponding electronic objects associated with the package or by transferring the package and the index of the corresponding electronic objects.

21. The method of claim 20, wherein the package is implemented as an internet accessible electronic object repository.

22. The method of claim 20, wherein electronic objects associated with the package are hosted on remote sites.

23. The method of claim 20, wherein the package is implemented as an client-hosted electronic object repository.

24. The method of claim 19, further comprising:
receiving an electronic object selection indicator;
retrieving a copy of the electronic object identified by the selection indicator; and
initiating a process to facilitate read/writeable access to the electric object.

25. The method of claim 24, wherein the process is an application that allows a user to view the electronic object.

26. The method of claim 24, wherein the process is an application that enables a user to modify the electronic object.

27. The method of claim 26, wherein the process is an application that enables a user to save modifications to the electronic object.

28. The method of claim 27, wherein the process is an application that enables a user to replace the original electronic object with a modified copy of the electronic object.

29. The method of claim 24, further comprising:
transmitting a copy of the electronic object to an email address or a fax recipient.

30. The method of claim 24, further comprising:
initiating an electronic object viewing process, wherein a viewing application is configured to enable a user to progressively view electronic objects with different file formats that have been associated with the package.

31. The method of claim 24, wherein a plurality of users are associated with the package identifier and each has searchable/readable/writeable access.

32. The method of claim 19, further comprising:
receiving a user-defined search term;
searching a plurality of electronic objects for electronic objects containing the search term; and
generating a sub-index configured as a search result group of all electronic objects that contain the search term.

33. The method of claim 32, further comprising:
initiating an electronic object viewing process, wherein a viewing application is configured to enable a user to progressively view electronic objects with associated with the sub-index.

34. The method of claim 32, wherein the user-defined search term corresponds to a an indexing identifier.

35. The method of claim 32, further comprising:
receiving an electronic object selection indicator;
retrieving a copy of the electronic object identified by the selection indicator; and
initiating a process to facilitate read/writeable access to the electric object.

36. A processor-implemented method for accessing and managing data in a computing environment that connects at least one user, comprising:
storing at least an indexing identifier characteristic in an organizational index for the computing environment;
storing an electronic object that includes content data;
extracting the content data from the electronic object;
determining automatically via a processor at least one relationship between the electronic object and the indexing identifier characteristic in the organizational index for the computing environment, said at least one relationship determined from a dynamic system correlation by comparing the at least one indexing identifier characteristic with the content data; and
storing said at least one relationship in the computing environment.

37. The method of claim 36, wherein said organizational index is implemented by a database management system.

38. The method of claim 36, wherein said computing environment is a document management system.

39. The method of claim 36, wherein said at least one relationship results in a "n" to "m" relation capable of accessing and managing each indexing identifier characteristic from a determination of at least one indexing identifier characteristic.

40. The method of claim 36, further comprising:
receiving the electronic object.

41. The method of claim 40, wherein the receiving of the electronic object is from an application program.

42. The method of claim 41, wherein the application program includes a word processing program, a spreadsheet program, a presentation authoring program, a multimedia authoring program, an electronic mail program, a data transfer program, and a facsimile machine.

43. The method of claim 40, wherein the receiving of the electronic object is from a user of the document management system.

44. The method of claim 36, wherein the electronic object includes content data and data that describes the electronic object.

45. The method of claim 44, wherein the examining is of the content data.

46. The method of claim 45, wherein the determining of said at least one indexing identifier characteristic is based on the content data.

47. The method of claim 44, wherein the examining is of the data that describes the electronic object.

48. The method of claim 47, wherein the determining of said at least one indexing identifier characteristic is based on the data that describes the electronic object.

49. The method of claim 36, wherein said at least one indexing identifier characteristic identifies the electronic object.

50. The method of claim 36, wherein said at least one indexing identifier characteristic uniquely identifies the electronic object.

51. The method of claim 36, wherein said at least one indexing identifier characteristic includes a classification, and a name.

52. The method of claim 36, wherein a first electronic object having a first relationship to a first entry of the organizational index links to a second electronic object having a second relationship to a second entry of the organizational index when the first entry and the second entry are the same.

53. The method of claim 52, wherein access to the first electronic object also provides access to the second electronic object.

54. The method of claim 36, wherein the organizational index includes at least one entry.

55. The method of claim 54, wherein the determining of said at least one relationship further comprises:
associating the electronic object with at least one of said at least one entry.

56. The method of claim 55, wherein access to one of said at least one entry allows access to each associated electronic object.

57. A processor-directed system for managing access to data stored in a document management system, comprising:
means to extract information from an electronic object, wherein the electronic object is configured in accordance with one of a plurality of allowed base electronic object formats;
means to determine at least one indexing identifier characteristic of the electronic object using the extracted information;
means to determine at least one relationship between the electronic object and an organizational index for the document management system, said at least one relationship determined from a dynamic system correlation including:
comparing the at least one indexing identifier characteristic of the electronic object with the organizational index; and
associating the at least one indexing identifier characteristic of the electronic object with a transferable package;
means to update the organizational index to incorporate the at least one indexing identifier characteristic of the electronic object;
means to store the electronic object in association with the transferable package corresponding to the organizational index in the document management system; and
means to store said at least one relationship in the document management system.

58. The system of claim 57, further comprising:
means to receive the electronic object.

59. The system of claim 58, wherein the receiving of the electronic object is from an application program.

60. The system of claim 59, wherein the application program includes a word processing program, a spreadsheet program, a presentation authoring program, a multimedia authoring program, an electronic mail program, a data transfer program, and a facsimile machine.

61. The system of claim 58, wherein the receiving of the electronic object is from a user of the document management system.

62. The system of claim 57, wherein the electronic object includes content data and data that describes the electronic object.

63. The system of claim 62, wherein the examining is of the content data.

64. The system of claim 63, wherein the determining of said at least one indexing identifier characteristic is based on the content data.

65. The system of claim 62, wherein the examining is of the data that describes the electronic object.

66. The system of claim 65, wherein the determining of said at least one indexing identifier characteristic is based on the data that describes the electronic object.

67. The system of claim 57, wherein said at least one indexing identifier characteristic identifies the electronic object.

68. The system of claim 57, wherein said at least one indexing identifier characteristic uniquely identifies the electronic object.

69. The system of claim 57, wherein said at least one indexing identifier characteristic includes a classification, and a name.

70. The system of claim 57, wherein a first electronic object having a first relationship to a first entry of the organizational index links to a second electronic object having a second relationship to a second entry of the organizational index when the first entry and the second entry are the same.

71. The system of claim 70, wherein access to the first electronic object also provides access to the second electronic object.

72. The system of claim 57, wherein the organizational index includes at least one entry.

73. The system of claim 72, wherein the determining of said at least one relationship further comprises:
means to associate the electronic object with at least one of said at least one entry.

74. The system of claim 73, wherein access to one of said at least one entry allows access to each associated electronic object.

75. A medium readable by a processor for managing access to data stored in a document management system, comprising:
executable instructions in the processor readable medium, wherein the instructions are executable by the processor to:
examine an electronic object, wherein the electronic object is configured in accordance with one of a plurality of allowed base electronic object formats;
extract information from the electronic object based on examining the electronic object;
determine at least one indexing identifier characteristic of the electronic object using the extracted information;
determine automatically at least one relationship between the electronic object and an organizational index for the document management system, said at least one relationship determined from a dynamic system correlation including:

compare the at least one indexing identifier characteristic of the electronic object with the organizational index; and associate the at least one indexing identifier characteristic of the electronic object with a transferable package;

update the organizational index to incorporate the at least one indexing identifier characteristic of the electronic object;

store the electronic object in association with the transferable package corresponding to the organizational index in the document management system; and store said at least one relationship in the document management system.

76. An apparatus for managing access to data stored in a document management system, comprising:

a memory;

a processor disposed in communication with said memory, and configured to issue a plurality of executable instructions stored in the memory to:

examine an electronic object, wherein the electronic object is configured in accordance with one of a plurality of allowed base electronic object formats;

extract information from the electronic object based on examining the electronic object;

determine at least one indexing identifier characteristic of the electronic object using the extracted information;

determine automatically at least one relationship between the electronic object and an organizational index for the document management system, said at least one relationship determined from a dynamic system correlation including:

compare the at least one indexing identifier characteristic of the electronic object with the organizational index; and associate the at least one indexing identifier characteristic of the electronic object with a transferable package;

update the organizational index to incorporate the at least one indexing identifier characteristic of the electronic object;

store the electronic object in association with the transferable package corresponding to the organizational index in the document management system; and store said at least one relationship in the document management system.

77. An apparatus for accessing and managing data in a computing environment that connects at least one user, comprising:

a memory;

a processor disposed in communication with said memory, and configured to issue a plurality of processing instructions stored in the memory, wherein the instructions are configured to:

store at least an indexing identifier characteristic in an organizational index for the computing environment;

store an electronic object that includes content data;

extract the content data from the electronic object;

determine automatically at least one relationship between the electronic object and the indexing identifier characteristic in the organizational index for the computing environment, said at least one relationship determined from a dynamic system correlation by comparing the at least one indexing identifier with the content data; and store said at least one relationship in the computing environment.

* * * * *

UNITED STATES PATENT AND TRADEMARK OFFICE
CERTIFICATE OF CORRECTION

| | | |
|---|---|---|
| PATENT NO. | : 7,814,134 B2 | Page 1 of 1 |
| APPLICATION NO. | : 10/873775 | |
| DATED | : October 12, 2010 | |
| INVENTOR(S) | : Gustavo S. Leonardos | |

It is certified that error appears in the above-identified patent and that said Letters Patent is hereby corrected as shown below:

On the title page item (76), "Inventor: Gustavos Leonardos, Pintor Oswaldo Teixeira 380, Barra da Tijuca, Rio de Janeiro, R. J. 22631-420 (BR)" should be changed to read "Inventor: Gustavo S. Leonardos, Pintor Oswaldo Teixeira 380, Barra da Tijuca, Rio de Janeiro, R. J. 22631-420 (BR)"

Signed and Sealed this

Eleventh Day of January, 2011

David J. Kappos
*Director of the United States Patent and Trademark Office*